US010551895B2

(12) United States Patent
Yokoyama

(10) Patent No.: US 10,551,895 B2
(45) Date of Patent: Feb. 4, 2020

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Junnosuke Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 14/095,949

(22) Filed: Dec. 3, 2013

(65) Prior Publication Data
US 2014/0157032 A1 Jun. 5, 2014

(30) Foreign Application Priority Data

Dec. 5, 2012 (WO) .................. PCT/JP2012/081469

(51) Int. Cl.
G06F 1/26 (2006.01)
G06F 1/3215 (2019.01)
G06F 1/3231 (2019.01)
G06F 1/3234 (2019.01)
H04N 1/00 (2006.01)
(Continued)

(52) U.S. Cl.
CPC .......... *G06F 1/3215* (2013.01); *G06F 1/3231* (2013.01); *G06F 1/3284* (2013.01); *H04N 1/00395* (2013.01); *H04N 1/00891* (2013.01); *H04N 1/00896* (2013.01); *H04N 1/00928* (2013.01); *G06F 1/3203* (2013.01); *G06F 1/3287* (2013.01); *H04N 2201/0098* (2013.01); *Y02D 10/159* (2018.01); *Y02D 10/173* (2018.01)

(58) Field of Classification Search
CPC ......... G06F 1/3231; G06F 1/32; G06F 1/3284
USPC ....................................... 713/320
See application file for complete search history.

(56) References Cited

U.S. PATENT DOCUMENTS 5,938,772 A * 8/1999 Welch .................... G06F 1/181
713/320
6,107,930 A * 8/2000 Behlke .................. G08B 13/19
340/3.7
(Continued)

FOREIGN PATENT DOCUMENTS

EP 1569436 A2 8/2005
JP S61-032066 A 2/1986
(Continued)

OTHER PUBLICATIONS

Del XPS 420 Owner's Manual, Dell Inc., Nov. 27, 2007.

*Primary Examiner* — Volvick Derose
(74) *Attorney, Agent, or Firm* — Canon U.S.A., Inc. IP Division

(57) ABSTRACT

An image forming apparatus that enters a first power state in which a predetermined function is executable and a second power state in which the predetermined function is not executable includes a detection unit configured to detect an object; a return unit that a user operates in order to shift the image forming apparatus from the second power state to the first power state; a notification unit configured to, in a case where an object has been detected by the detection unit, notify a user of a position of the return unit; and a power-source control unit configured to, in a case where the return unit has been operated by the user, shift the image forming apparatus from the second power state to the first power state.

20 Claims, 16 Drawing Sheets

(51) Int. Cl.
*G06F 1/3203* (2019.01)
*G06F 1/3287* (2019.01)

(56) References Cited

U.S. PATENT DOCUMENTS

| | | | | |
|---|---|---|---|---|
| 6,125,449 | A * | 9/2000 | Taylor | G06F 1/26 345/212 |
| 6,166,355 | A * | 12/2000 | Watanabe | G03G 15/5004 219/216 |
| 6,289,466 | B1 * | 9/2001 | Bayramoglu | G06F 1/1601 710/10 |
| 6,353,893 | B1 * | 3/2002 | Liu | G06F 1/3203 713/320 |
| 7,340,626 | B2 * | 3/2008 | Maitani | G03G 15/5004 219/497 |
| 9,635,205 | B2 * | 4/2017 | Yokoyama | H04N 1/00896 |
| 2002/0186325 | A1 * | 12/2002 | Mears | H04N 5/63 348/730 |
| 2003/0177402 | A1 * | 9/2003 | Piazza | G06F 1/3231 713/300 |
| 2003/0184498 | A1 * | 10/2003 | Blumberg | G06F 3/017 345/1.2 |
| 2005/0190707 | A1 * | 9/2005 | Nishizawa | H04N 1/0035 370/286 |
| 2005/0201212 | A1 * | 9/2005 | Greenstein | G06F 1/1626 369/24.01 |
| 2005/0268036 | A1 * | 12/2005 | Kinnan | G06F 3/0605 711/114 |
| 2005/0289363 | A1 * | 12/2005 | Tsirkel | G06F 1/3203 713/300 |
| 2006/0176167 | A1 * | 8/2006 | Dohrmann | G08B 25/001 340/506 |
| 2006/0190750 | A1 * | 8/2006 | Maggi | G06F 1/3203 713/320 |
| 2006/0215495 | A1 * | 9/2006 | Soled | A61J 7/0481 368/10 |
| 2006/0261818 | A1 * | 11/2006 | Zank | G01V 3/088 324/457 |
| 2007/0081186 | A1 | 4/2007 | Numata | |
| 2007/0173291 | A1 | 7/2007 | Morotomi | |
| 2007/0211746 | A1 * | 9/2007 | Oshikiri | G06F 13/4022 370/437 |
| 2007/0296701 | A1 * | 12/2007 | Pope | G06F 1/3215 345/168 |
| 2008/0245643 | A1 * | 10/2008 | Chen | H01H 13/023 200/295 |
| 2008/0250096 | A1 * | 10/2008 | Koide | H04N 21/43637 709/201 |
| 2009/0072988 | A1 * | 3/2009 | Haywood | G08B 13/19658 340/686.6 |
| 2009/0148006 | A1 * | 6/2009 | Hayasaki | G06K 9/00221 382/118 |
| 2009/0273687 | A1 * | 11/2009 | Tsukizawa | G06F 3/012 348/222.1 |
| 2009/0322524 | A1 | 12/2009 | Nakazato | |
| 2010/0150600 | A1 | 6/2010 | Oyoshi | |
| 2010/0231390 | A1 | 9/2010 | Hashimoto | |
| 2011/0199629 | A1 | 8/2011 | Sensu | |
| 2011/0273546 | A1 * | 11/2011 | Lin | G06K 9/00771 348/61 |
| 2012/0025717 | A1 * | 2/2012 | Klusmann | H05B 37/0218 315/152 |
| 2012/0050779 | A1 | 3/2012 | Tani | |
| 2012/0127518 | A1 * | 5/2012 | Ogata | G06F 1/3231 358/1.15 |
| 2012/0139427 | A1 * | 6/2012 | Tsai | H05B 33/0854 315/158 |
| 2012/0204046 | A1 * | 8/2012 | Baba | G06F 1/3231 713/323 |
| 2012/0229831 | A1 * | 9/2012 | Kuroishi | H04N 1/00891 358/1.13 |
| 2012/0306371 | A1 * | 12/2012 | Du | F21V 23/0471 315/113 |
| 2012/0327458 | A1 * | 12/2012 | Baba | G03G 15/5004 358/1.15 |
| 2013/0009875 | A1 * | 1/2013 | Fry | G06F 3/0304 345/168 |
| 2013/0057894 | A1 * | 3/2013 | Narushima | G03G 15/5004 358/1.14 |
| 2013/0073887 | A1 * | 3/2013 | Miki | G06F 1/3231 713/323 |
| 2013/0083344 | A1 * | 4/2013 | Funakawa | H04N 1/00127 358/1.13 |
| 2013/0120779 | A1 * | 5/2013 | Baba | G03G 15/5004 358/1.13 |
| 2013/0128298 | A1 * | 5/2013 | Yamada | G06K 15/02 358/1.13 |
| 2014/0097956 | A1 * | 4/2014 | Imamura | G06F 21/32 340/573.1 |

FOREIGN PATENT DOCUMENTS

| | | |
|---|---|---|
| JP | S63-003612 A | 1/1988 |
| JP | H02-008922 A | 1/1990 |
| JP | 3-096969 A | 4/1991 |
| JP | H03-096969 A | 4/1991 |
| JP | H06-019257 A | 1/1994 |
| JP | 6-242226 A | 9/1994 |
| JP | H06-242226 A | 9/1994 |
| JP | 10-105291 A | 4/1998 |
| JP | H10-105291 A | 4/1998 |
| JP | S63-261270 A | 10/1998 |
| JP | 11-069027 A | 3/1999 |
| JP | H11-069027 A | 3/1999 |
| JP | 2004-114332 A | 4/2004 |
| JP | 2004-125989 A | 4/2004 |
| JP | 2004-207411 A | 7/2004 |
| JP | 2005-165061 A | 6/2005 |
| JP | 2005-212406 A | 8/2005 |
| JP | 2007-049308 A | 2/2007 |
| JP | 2007-088890 A | 4/2007 |
| JP | 2007-105937 A | 4/2007 |
| JP | 2007-180934 A | 7/2007 |
| JP | 2008-027115 A | 2/2008 |
| JP | 2008-062592 A | 3/2008 |
| JP | 2008-299877 A | 12/2008 |
| JP | 2010-008617 A | 1/2010 |
| JP | 2011-164835 A | 8/2011 |
| JP | 2012-017796 A | 1/2012 |
| JP | 2012-048526 A | 3/2012 |
| JP | 2012-168211 A | 9/2012 |
| JP | 2012-175627 A | 9/2012 |
| JP | 2012-177796 A | 9/2012 |
| JP | 50-83447 B1 | 11/2012 |
| JP | 05083447 B1 | 11/2012 |
| JP | 2013-103423 A | 5/2013 |

* cited by examiner

FIG. 7
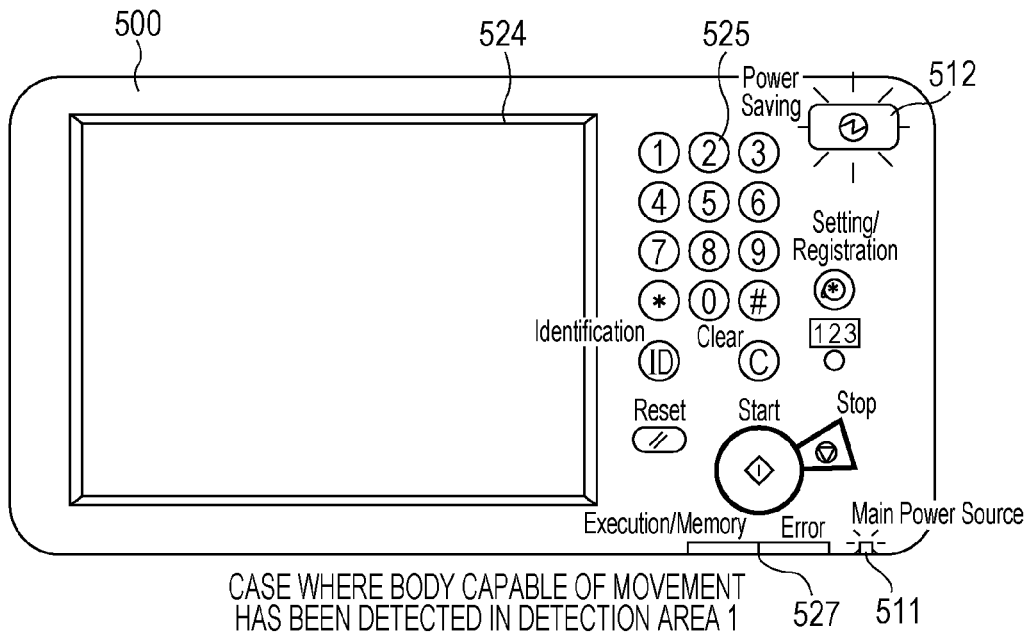
CASE WHERE BODY CAPABLE OF MOVEMENT HAS BEEN DETECTED IN DETECTION AREA 1
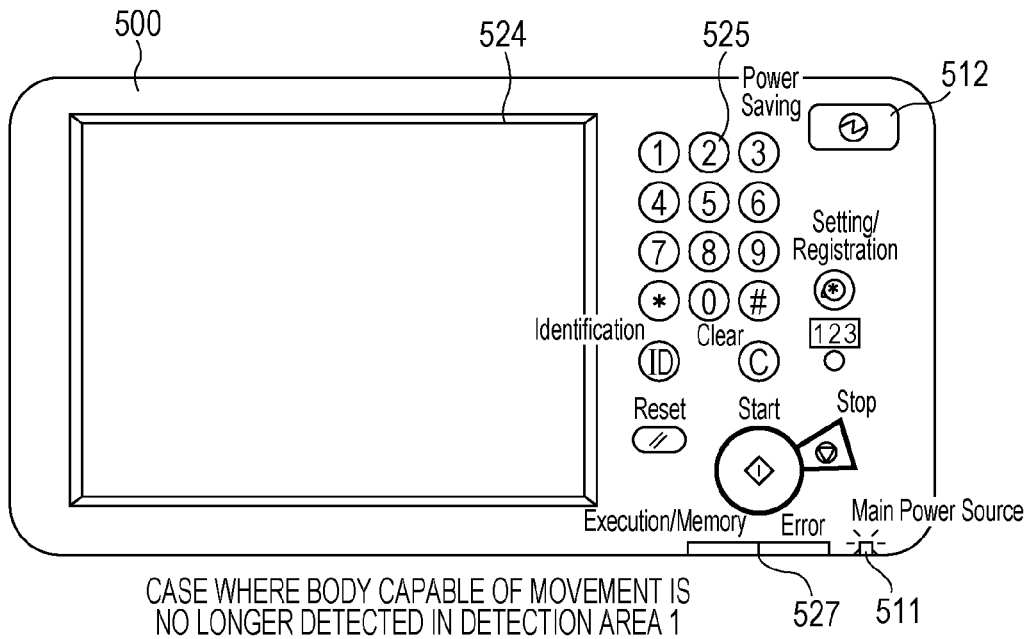
CASE WHERE BODY CAPABLE OF MOVEMENT IS NO LONGER DETECTED IN DETECTION AREA 1

FIG. 11
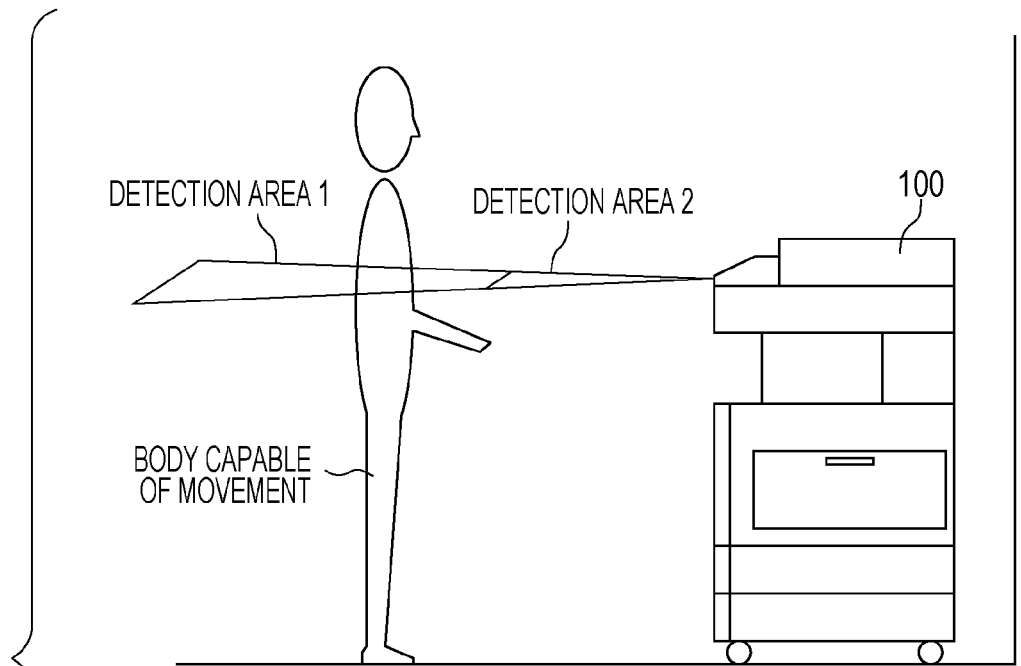
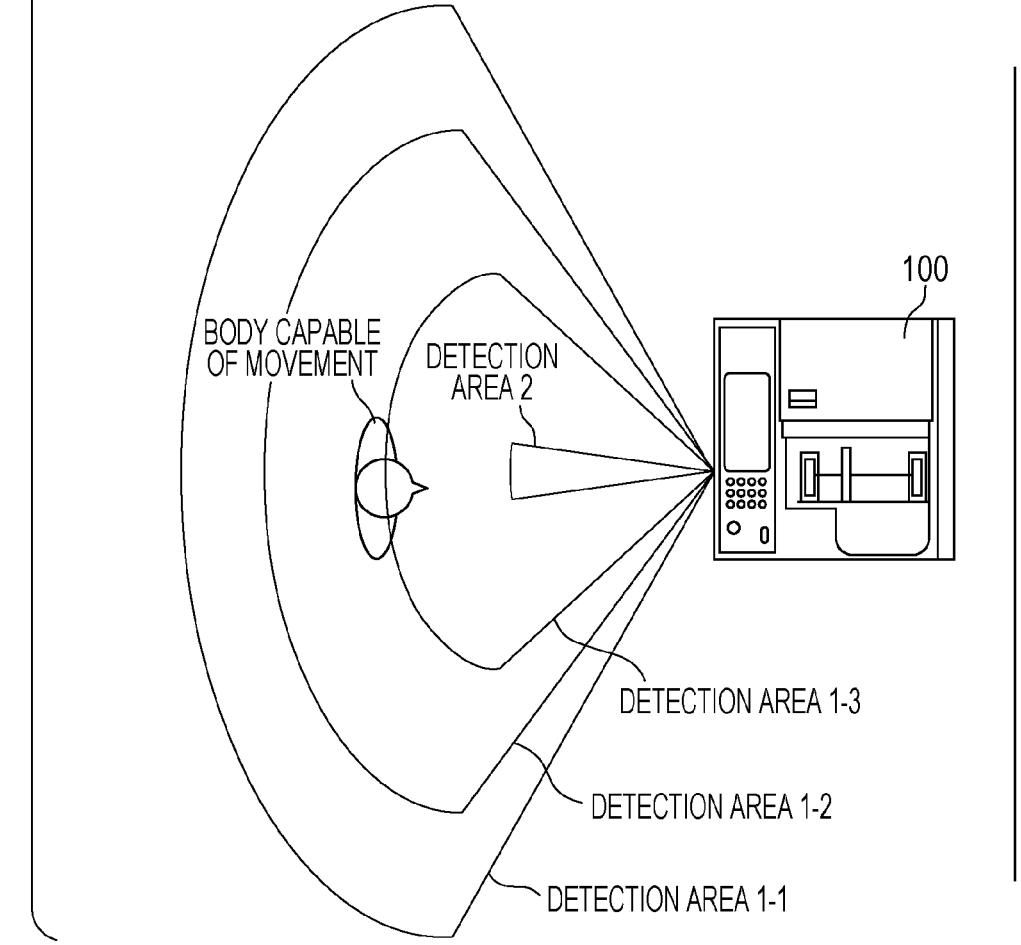

FIG. 16
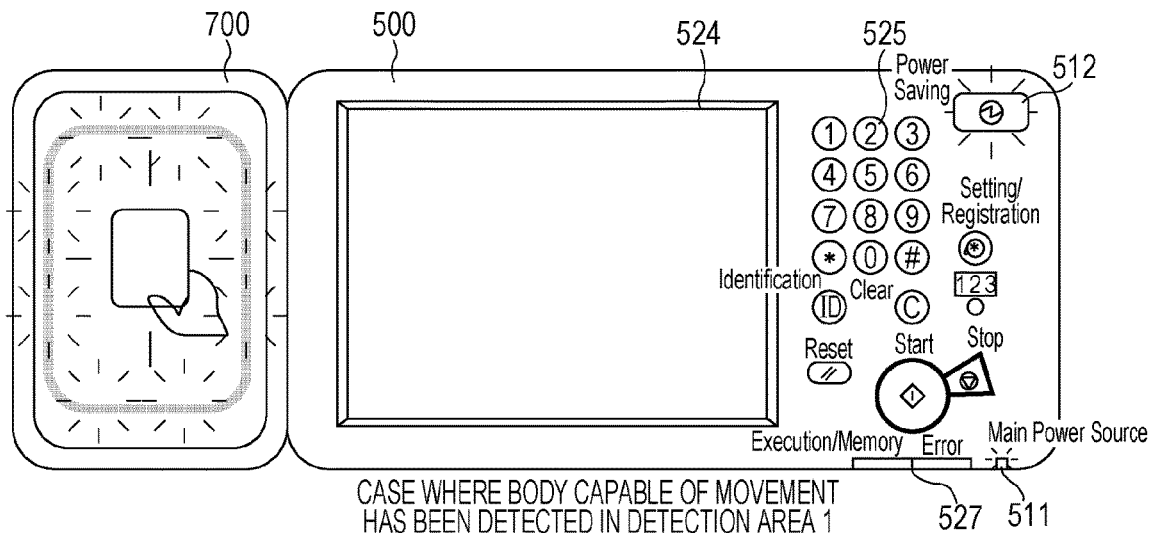
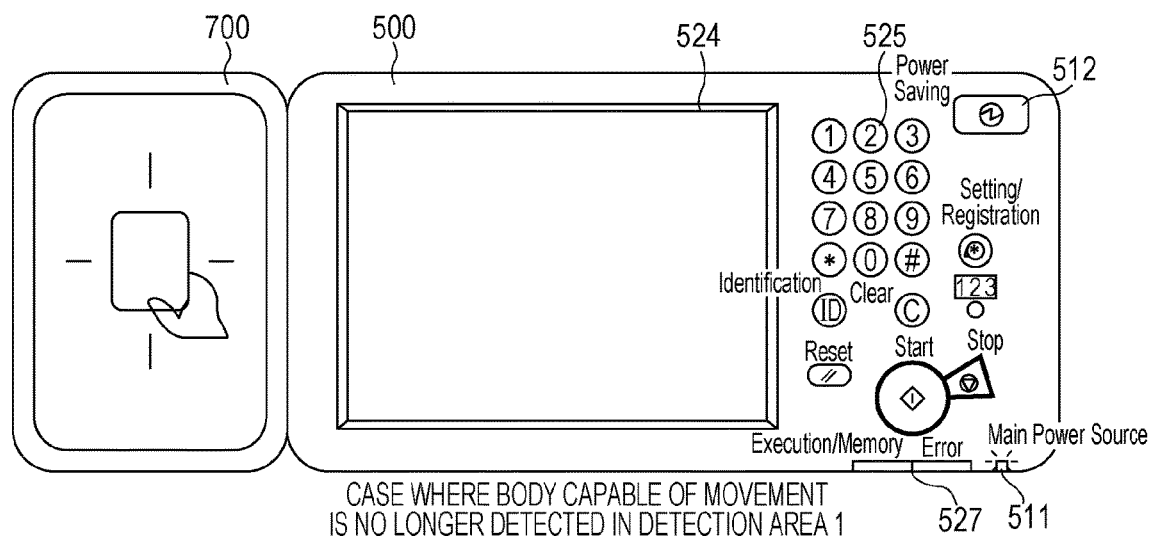
FIG. 17
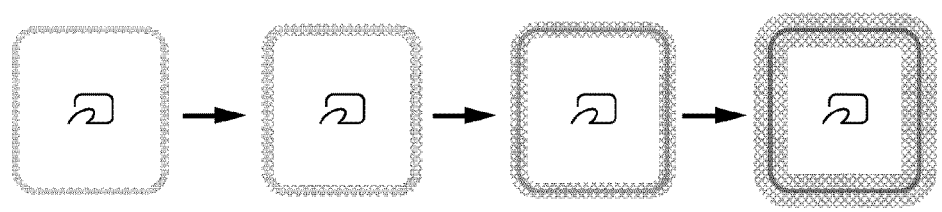

IMAGE FORMING APPARATUS AND METHOD FOR CONTROLLING IMAGE FORMING APPARATUS

TECHNICAL FIELD

The present invention relates to an image forming apparatus or the like that includes a human-body detection sensor which detects an object such as a person in the vicinity thereof.

BACKGROUND ART

A technique is known, in which a user returns, by pressing a power saving button provided in an image forming apparatus, the image forming apparatus that is in a power conservation state to a normal power state. Furthermore, in recent years, an image forming apparatus has been proposed, which detects, using a human-body detection sensor, a person who has come close to the image forming apparatus even when a user does not press the power saving button, and which automatically returns from the power conservation state to the normal power state (See PTL 1).

In PTL 1, a technique is disclosed, in which an image forming apparatus is returned, using two human-body detection sensors having different detection ranges, from the power conservation state to the normal power state. In the image forming apparatus disclosed in PTL 1, when a person who has come close to the image forming apparatus has been detected by a first human-body detection sensor having a large detection range, a second human-body detection sensor whose detection range is smaller than that of the first human-body detection sensor is activated. Then, when the person has been detected by the activated second human-body detection sensor, the image forming apparatus returns from the power conservation state to the normal power state.

However, in the image forming apparatus using human-body detection sensors, which is disclosed in PTL 1 described above, there is a case in which the image forming apparatus is not able to automatically return from the power conservation state to the normal power state, depending on a position at which a user stands up with respect to the image forming apparatus. For example, in the case where the user exists at the blind spot of the second human-body detection sensor, it is impossible for the second human-body detection sensor to detect the user. Thus, it is impossible for the image forming apparatus to automatically return from the power conservation state to the normal power state.

In the case where the image forming apparatus does not automatically return from the power conservation state to the normal power state, the user presses the power saving button, thereby returning the image forming apparatus to the normal power state. However, for the user who is accustomed to using the image forming apparatus that automatically returns, using a human-body detection sensor, to the normal power state, an operation for manually returning the image forming apparatus to the normal power state is an operation that the user is not accustomed to performing. Therefore, in front of the image forming apparatus, the user is forced to perform a task for returning the image forming apparatus to the normal power state.

CITATION LIST

Patent Literature

PTL 1 Japanese Patent Laid-Open No. 2012-17796

It is an object of the present invention to provide an image forming apparatus or the like which can make a user recognize a position which the user should operate in order to manually return the image forming apparatus to a normal power state, even in the case where the image forming apparatus does not automatically return, using a human-body detection sensor, from a power conservation state to the normal power state.

SUMMARY OF INVENTION

An image forming apparatus according to the present invention is an image forming apparatus that enters a first power state in which a predetermined function is executable and a second power state in which the predetermined function is not executable. The image forming apparatus includes a detection unit configured to detect an object; a return unit that a user operates in order to shift the image forming apparatus from the second power state to the first power state; a notification unit configured to, in a case where an object has been detected by the detection unit, notify a user of a position of the return unit; and a power-source control unit configured to, in a case where the return unit has been operated by the user, shift the image forming apparatus from the second power state to the first power state.

Further features of the present invention will become apparent from the following description of exemplary embodiments with reference to the attached drawings.

BRIEF DESCRIPTION OF DRAWINGS

FIG. 7 is a diagram of the operation section, which illustrates a state in which a light-emitting element LED emits light.

FIG. 11 is a diagram illustrating detection areas of a sensor section of an image forming apparatus according to a second embodiment.

FIG. 16 is a diagram of an operation section, which illustrates a state in which a light-emitting element LED of an image forming apparatus according to a fourth embodiment emits light.

FIG. 17 is a diagram illustrating a state in which an NFC section of the image forming apparatus according to the fourth embodiment emits light.

DESCRIPTION OF EMBODIMENTS

Hereinafter, embodiments of the present invention will be described using the drawings.

First Embodiment

Overview of Image Forming Apparatus

Figure 1:
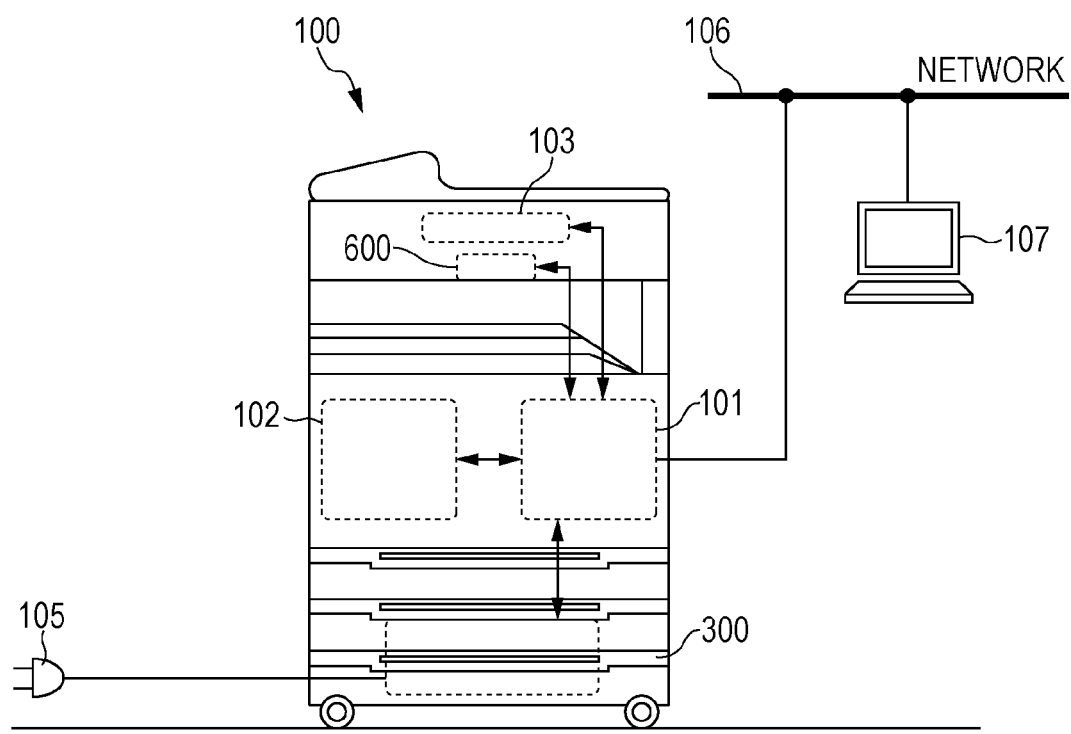
FIG. 1 is a diagram of an overall configuration of an image forming apparatus according to a first embodiment.

FIG. 1 is a schematic diagram of an image forming apparatus 100 according to a first embodiment of the present invention.

The image forming apparatus 100 is an MFP (Multifunction Peripheral) having a plurality of functions such as a scanner function, a print function, and a fax function. The image forming apparatus 100 enters a plurality of power states, such as a normal power state (a first power state) in which the scanner function and the print function, which are mentioned above, are executable, and a power conservation state (a second power state) in which the scanner function and the print function are not executable. The power conservation state is a power state in which the amount of power consumed is smaller than that in the normal power state. In the power conservation state, data is received from a network or a user operates a power saving button 512, which is described below, whereby the image forming apparatus 100 can return to the normal power state.

Note that the image forming apparatus 100 may enter a suspend state or a hibernation state other than the normal power state and the power conservation state, which are described above. The suspend state is a state in which the image forming apparatus 100 can return to the normal power state at a high speed. In the suspend state, energization of a memory unit 315, which is described below, is maintained, and, using a state of the image forming apparatus 100 immediately prior to entering the suspend state that is a state stored in the memory unit 315, the image forming apparatus 100 returns to the normal power state at a high speed. Furthermore, the hibernation state is also a state in which the image forming apparatus 100 can return to the normal power state at a high speed. In the hibernation state, the power state is similar to a power-off state in which supply of power to the individual sections of the image forming apparatus 100 is stopped, and supply of power to the individual sections of the image forming apparatus 100 is stopped. However, the difference from the power-off state is that the state of the image forming apparatus 100 immediately prior to entering the hibernation state is stored in an HDD unit 316 which is described below. In the case of returning from the hibernation state to the normal power state, using the state of the image forming apparatus 100 that is the state stored in the HDD unit 316, the image forming apparatus 100 returns to the normal power state at a high speed.

As illustrated in FIG. 1, the image forming apparatus 100 includes a main controller section 101, a printer section 102, a scanner section 103, a sensor section 600, an AC plug 105, and a power-source device 300. The printer section 102 forms an image on a sheet-shaped recording medium (a sheet of paper), for example, in accordance with an electrophotographic system. The scanner section 103 optically reads an image from an original document, and performs conversion into a digital image. The main controller section 101 controls the individual sections of the image forming apparatus 100. Furthermore, the main controller section 101 is connected to a PC 107 via a network 106. The network 106 is a local area network (LAN), such as USB (Universal Serial Bus), or a wide area network (WAN), such as the Internet, and it does not matter whether the network 106 is a wired or wireless network. Note that the details of the main controller section 101 will be described below. The AC plug 105 is inserted into a socket that is provided outside the apparatus. An alternating current power source is provided from alternating current Mains electricity to the image forming apparatus 100 via the AC plug 105. The power-source device 300 to which an alternating current power source is provided from alternating current Mains electricity provides a direct current power source for the individual sections of the image forming apparatus 100. Furthermore, in the present embodiment, the sensor section 600 is provided so as to detect, for example, a person who exists in the vicinity of the image forming apparatus 100. The details of the power-source device 300 and the sensor section 600, which are mentioned above, will be described below.

The PC 107 is connected to the image forming apparatus 100 via the network 106 or a local interface, such as USB, so as to be capable of communicating with the image forming apparatus 100. The PC 107 is a typical computer device which has a CPU, a RAM, and a fixed storage device, such as an HDD, and to which a monitor, a keyboard, a mouse, and so forth are connected. A printer driver program is installed in the PC 107. When the printer driver program is executed by the PC 107, the PC 107 generates PDL data in accordance with a render instruction that an operating system or an application program issues, and transmits the generated PDL data to the image forming apparatus 100. The PDL data is data that has been converted, by the printer driver program, into a page description language which can be processed by the image forming apparatus 100. The image forming apparatus 100 generates a bitmap image on the basis of the PDL data received from the PC 107. Then, the printer section 102 forms an image on a sheet of paper on the basis of the generated bitmap image.

Figure 2:
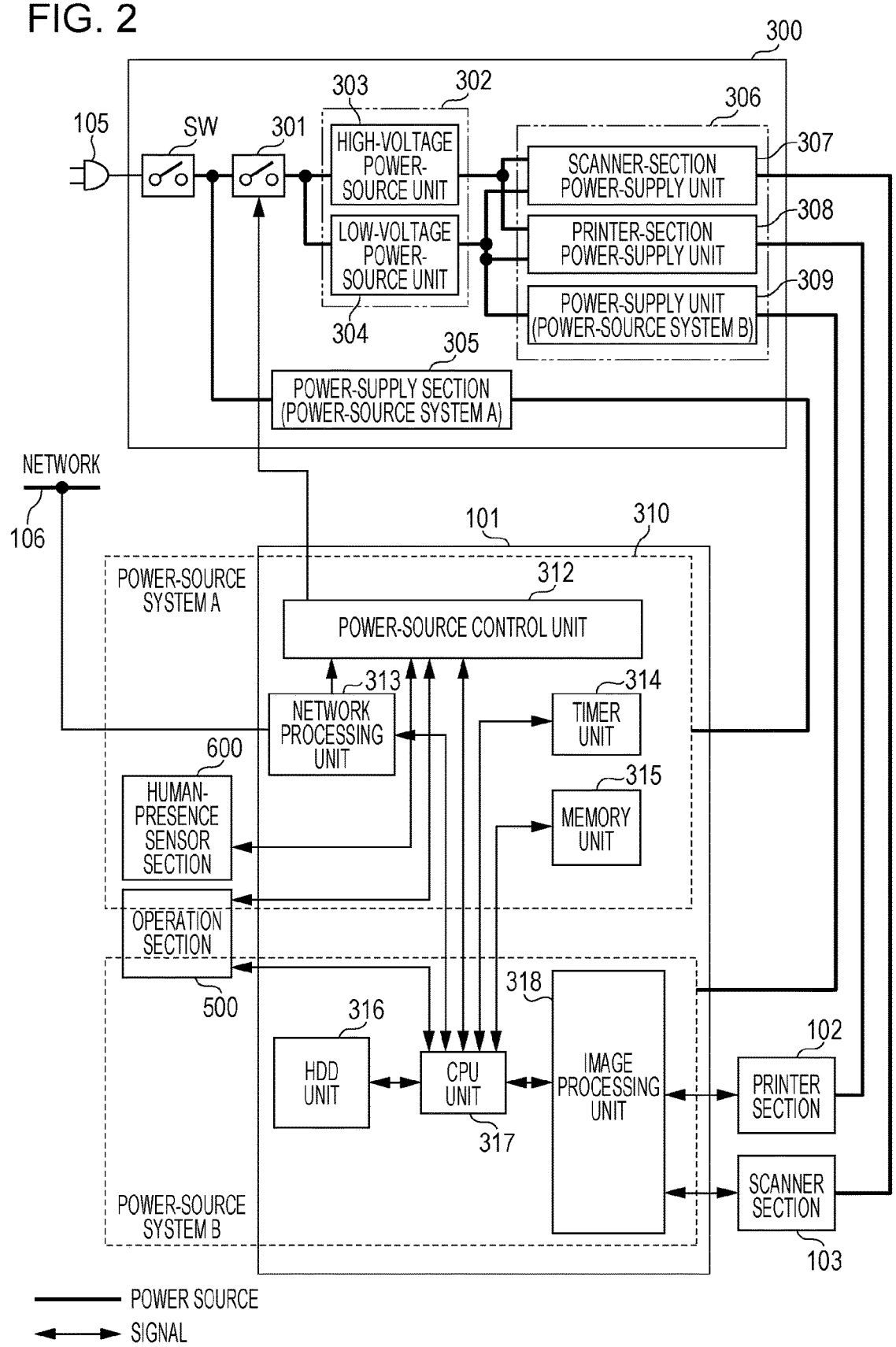
FIG. 2 is a circuit diagram of a power source of the image forming apparatus.

FIG. 2 is a hard block diagram illustrating the details of the main controller section and the power-source device of the image forming apparatus according to the first embodiment illustrated in FIG. 1.

Regarding Power-Source Systems

As illustrated in FIG. 2, the main controller section 101 is separated into a power-source system A, to which power is supplied in the normal power state and in the power conservation state, and a power-source system B, to which power is supplied in the normal power state although supply of power is stopped in the power conservation state. A power-source control unit 312, a network processing unit 313, a timer unit 314, the memory unit 315 of the main controller section 101 and the sensor section 600, which is described above, belong to the power-source system A. Furthermore, the HDD unit 316, a CPU unit 317, and an image processing unit 318 of the main controller section 101 belong to the power-source system B. Note that one portion of an operation section 500 that accepts a user operation belongs to the power-source system A, and the remaining portion belongs to the power-source system B.

Regarding Main Controller Section

The main controller section 101 has the power-source control unit 312, the network processing unit 313, the timer unit 314, the memory unit 315, the HDD unit 316, the CPU unit 317, and the image processing unit 318.

The power-source control unit 312 controls supply of power supplied to the individual sections of the image forming apparatus 100 and interruption of the supply of power. The power-source control unit 312 controls a relay of the power-source device 300, which is described below, so that the relay will be turned on/off. The power-source control unit 312 makes the relay 301 enter an off-state, whereby supply of power to the power-source system B, the printer section 102, and the scanner section 103 is stopped and the image forming apparatus 100 enters the power conservation state. Note that, when a main switch SW is turned off by a user operation, supply of power to the power-source system A is stopped.

The network processing unit 313 receives PDL data transmitted from the PC 107 via the network 106, or transmits configuration information of the image forming apparatus 100 to the network 106. The network processing unit 313 is connected to the power-source control unit 312 so as to be capable of communicating with the power-source control unit 312. Regarding the network processing unit 313, in the power conservation state, when the network processing unit 313 receives, via the network 106, for example, a network packet whose destination is the image forming apparatus 100, the network processing unit 313 outputs an activation signal to the power-source control unit 312. The power-source control unit 312 that has received the activation signal makes the relay 301 enter an on-state, thereby returning the image forming apparatus 100 from the power conservation state to the normal power state. Furthermore, also in the case where the network processing unit 313 has received data via a local interface such as USB, similarly, the local interface outputs the activation signal to the power-source control unit 312.

The timer unit 314 measures a time. The timer unit 314 is used to measure a predetermined time period that is measured in order that the image forming apparatus 100 shift from the normal power state to the power conservation state.

The memory unit 315 is a volatile memory such as DDRSDRAM, and is a main memory that stores, for example, user data generated by, for example, a control program executed by the CPU unit 317. Note that, in the above-described suspend state, energization of the memory unit 315 is maintained.

The HDD unit 316 is a storage device for temporarily storing a program to be executed by the CPU unit 317 or PDL data transmitted from the network 106.

The CPU unit 317 is a central processing device that performs control on the individual sections of the image forming apparatus 100. The CPU unit 317 performs, on the basis of a control program stored in the HDD unit 316, the copy function, the print function, or the like of the image forming apparatus 100.

The image processing unit 318 is connected to the CPU unit 317, the printer section 102, and the scanner section 103 so as to be capable of communicating with the CPU unit 317, the printer section 102, and the scanner section 103. The image processing unit 318 performs image processing, such as color space conversion, on image data read by the scanner section 103 and image data that is generated on the basis of PDL data received from the PC 107. Then, the image processing unit 318 converts the image data, which has been subjected to image processing, into bitmap data. The bitmap data is output to the printer section 102, and the printer section 102 forms an image on a sheet of paper on the basis of the bitmap data.

Regarding Power-Source Device

As illustrated in FIG. 2, the power-source device 300 includes the main switch SW, the relay 301, a power-source section 302, a power-supply section 306, and a power-supply section (the power-source system A) 305.

The main switch SW is a seesaw switch whose state is switched between an on-state and an off-state in a toggle manner by the user. The user makes the main switch SW enter the off-state, whereby the image forming apparatus 100 enters the power-off state in which supply of power to the individual sections of the image forming apparatus is stopped.

The relay 301 enters, using control of the power-source control unit 312, the on-state or off-state. When the relay 301 enters the on-state, the alternating current power source is provided for the power-source section 302 (a high-voltage power-source unit 303, a low-voltage power-source unit 304) via the AC plug 105. Note that the relay 301 may be a mechanical relay which enters, using electromagnetic induction, the on-state or off-state, or may be a semiconductor switch.

The power-source section 302 includes the high-voltage power-source unit 303 and the low-voltage power-source unit 304. The high-voltage power-source unit 303 converts the alternating current power source, which is input via the AC plug 105, into a direct current power source, and outputs a voltage of, for example, 24 V. Furthermore, the low-voltage power-source unit 304 converts the alternating current power source, which is input via the AC plug 105, into a direct current power source, and outputs a voltage of, for example, 12 V. The high-voltage power-source unit 303 is a power source that is, for example, used for a motor driving power source and a heater of a fixing unit of the printer section 102 and the scanner section 103. The low-voltage power-source unit 304 is a power source that is used for control units of the printer section 102 and the scanner section 103 and the power-source system B of the main controller section 101.

The power-supply section 306 has a scanner-section power-supply unit 307, a printer-section power-supply unit 308, and a power-supply unit (the power-source system B) 309. The scanner-section power-supply unit 307 supplies, using the high-voltage power-source unit 303 as an input source, power to a driving system of the scanner section 103. Furthermore, the scanner-section power-supply unit 307 supplies, using the low-voltage power-source unit 304 as an input source, power to the control unit of the scanner section 103. The printer-section power-supply unit 308 supplies, using the high-voltage power-source unit 303 as an input source, power to a driving system of the printer section 102. Furthermore, the printer-section power-supply unit 308 supplies, using the low-voltage power-source unit 304 as an input source, power to the control unit of the printer section 102. The power-supply unit (the power-source system B)

309 supplies, using the low-voltage power-source unit 304 as an input source, power to the power-source system B of the main controller section 101.

The power-supply section (the power-source system A) 305 converts the alternating current power source into a direct current power source, and outputs a voltage of, for example, 3.3 V to the power-source system A (the sensor section 600, the power-source control unit 312, the network processing unit 313, the timer unit 314, the memory unit 315).

Regarding Operation Section

Figure 3:
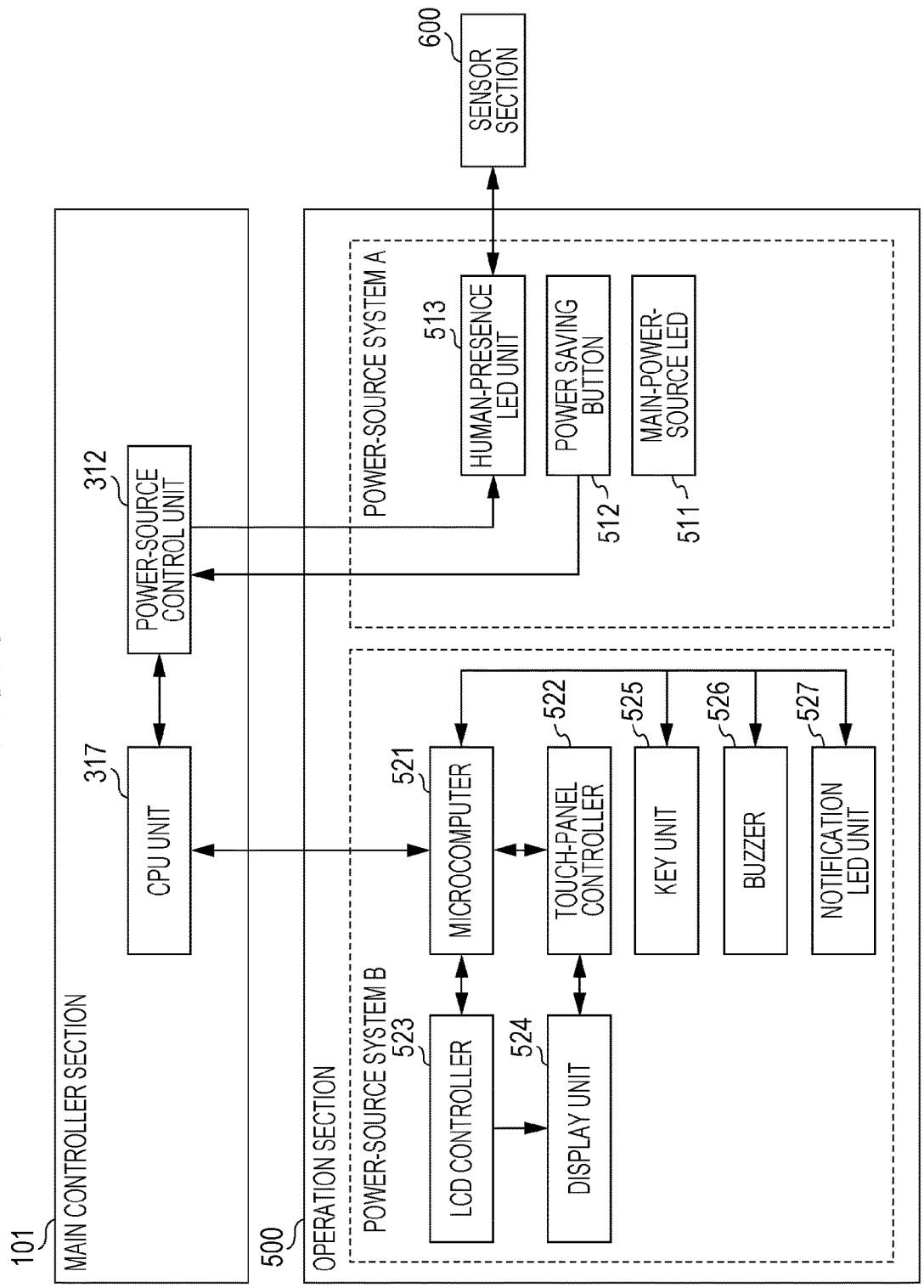
FIG. 3 is a hard block diagram of an operation section of the image forming apparatus.

FIG. 3 is a hard block diagram illustrating the details of the operation section 500 of the image forming apparatus according to the first embodiment illustrated in FIG. 1.

The operation section 500 has a display unit 524 that displays, for example, various types of setting screens of the image forming apparatus 100, a key unit 525 that is operated by the user, and so forth.

The operation section 500 is separated into the power-source system A and the power-source system B.

A main-power-source LED 511, the power saving button 512 (a return unit), and a human-presence LED unit 513 of the operation section 500 belong to the power-source system A. Furthermore, a microcomputer 521, a touch-panel controller 522, an LCD controller 523, the display unit 524, the key unit 525, a buzzer 526, and a notification LED unit 527 of the operation section 500 belong to the power-source system B.

The main-power-source LED 511 is an LED that performs illumination in the case where the image forming apparatus 100 is in the normal power state and in the case where the image forming apparatus 100 is in the power conservation state.

The power saving button 512 is a button for shifting the image forming apparatus 100 that is in the normal power state to the power conservation state. Furthermore, the power saving button 512 is also a button for shifting the image forming apparatus 100 that is in the power conservation state to the normal power state. The user presses the power saving button 512, whereby the user can shift the image forming apparatus 100 from the power conservation state to the normal power state, or from the normal power state to the power conservation state. The power saving button 512 is connected to the power-source control unit 312, and the power-source control unit 312 is notified that the power saving button 512 has been pressed. The power-source control unit 312 that has received this notification switches the relay 301 so that the relay 301 is turned on or off.

The human-presence LED unit (a notification unit) 513 performs illumination in the case where an object, such as a person, in the vicinity of the image forming apparatus 100 has been detected by the sensor section 600. Note that the details of the human-presence LED unit 513 will be described below.

The microcomputer 521 controls operations of the individual units of the operation section 500. Furthermore, the microcomputer 521 is connected to the CPU unit 317 of the main controller section 101 so as to be capable of communicating with the CPU unit 317.

The display unit 524 has an LCD panel that displays an image and a touch panel that is provided on the surface of the LCD panel.

The touch-panel controller 522 receives an input that has been provided for the touch panel which is provided on the surface of the LCD panel of the display unit 524.

The LCD controller 523 controls the LCD panel so that an image will be displayed on the LCD panel of the display unit 524.

The key unit 525 includes a ten key for inputting the number of sheets to be printed, a start key for stating execution of the copy function, and so forth.

The buzzer 526 outputs a sound, for example, when an error occurs.

The notification LED unit 527 is an LED which provides a notification that the image forming apparatus 100 is performing a job or that an error occurs in the image forming apparatus 100.

Regarding Sensor Section

Figure 4:
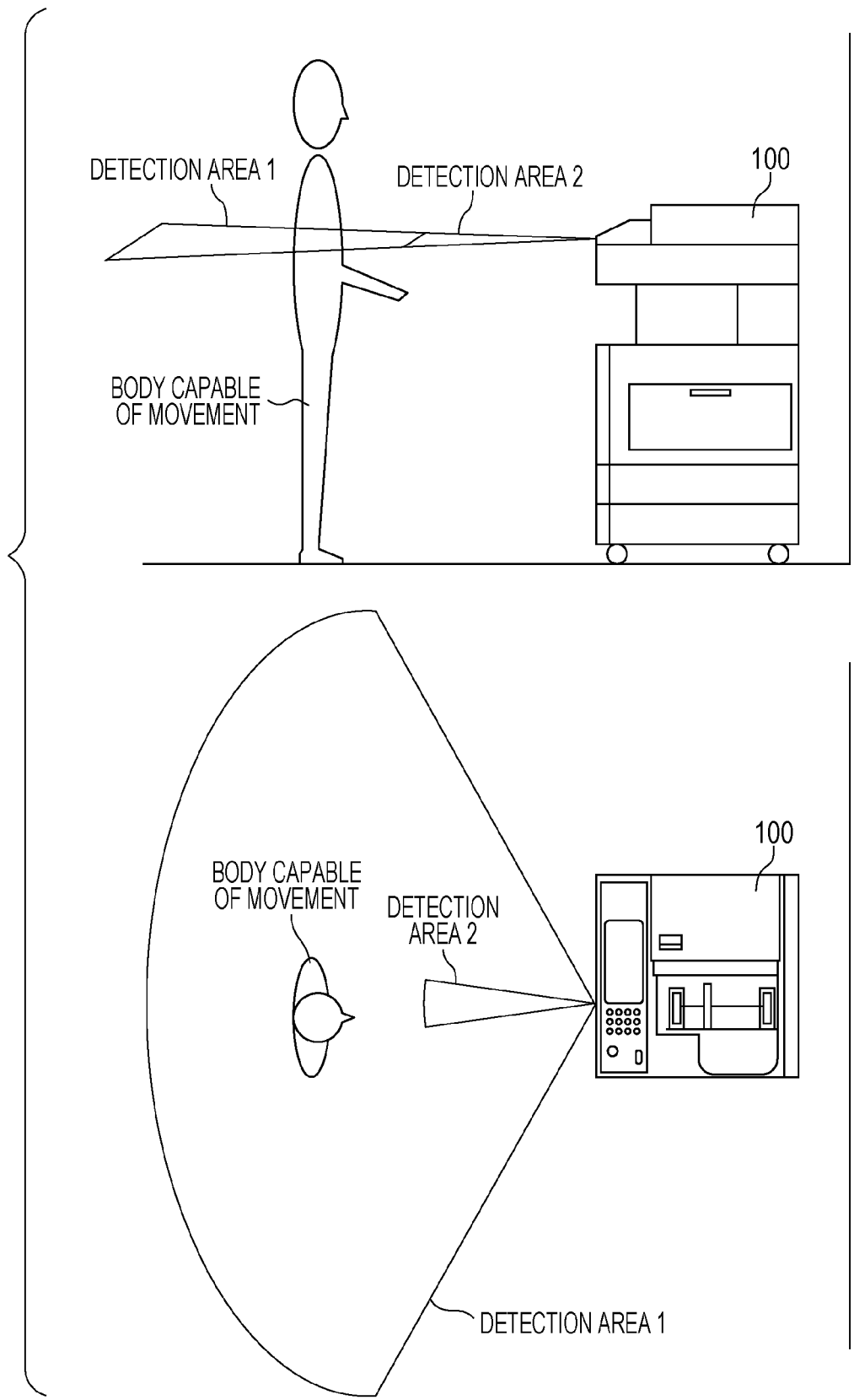
FIG. 4 is a diagram illustrating detection areas of a sensor section of the image forming apparatus.

FIG. 4 is a diagram illustrating detection areas of the sensor section 600.

The sensor section 600 has a detection area 1 (a first detection range) that is a range in which the sensor section 600 can detect an object, and a detection area 2 (a second detection range) that is smaller than the detection area 1. When an object has been detected in the detection area 2, the image forming apparatus 100 that is in the power conservation state returns to the normal power state.

Figure 5:
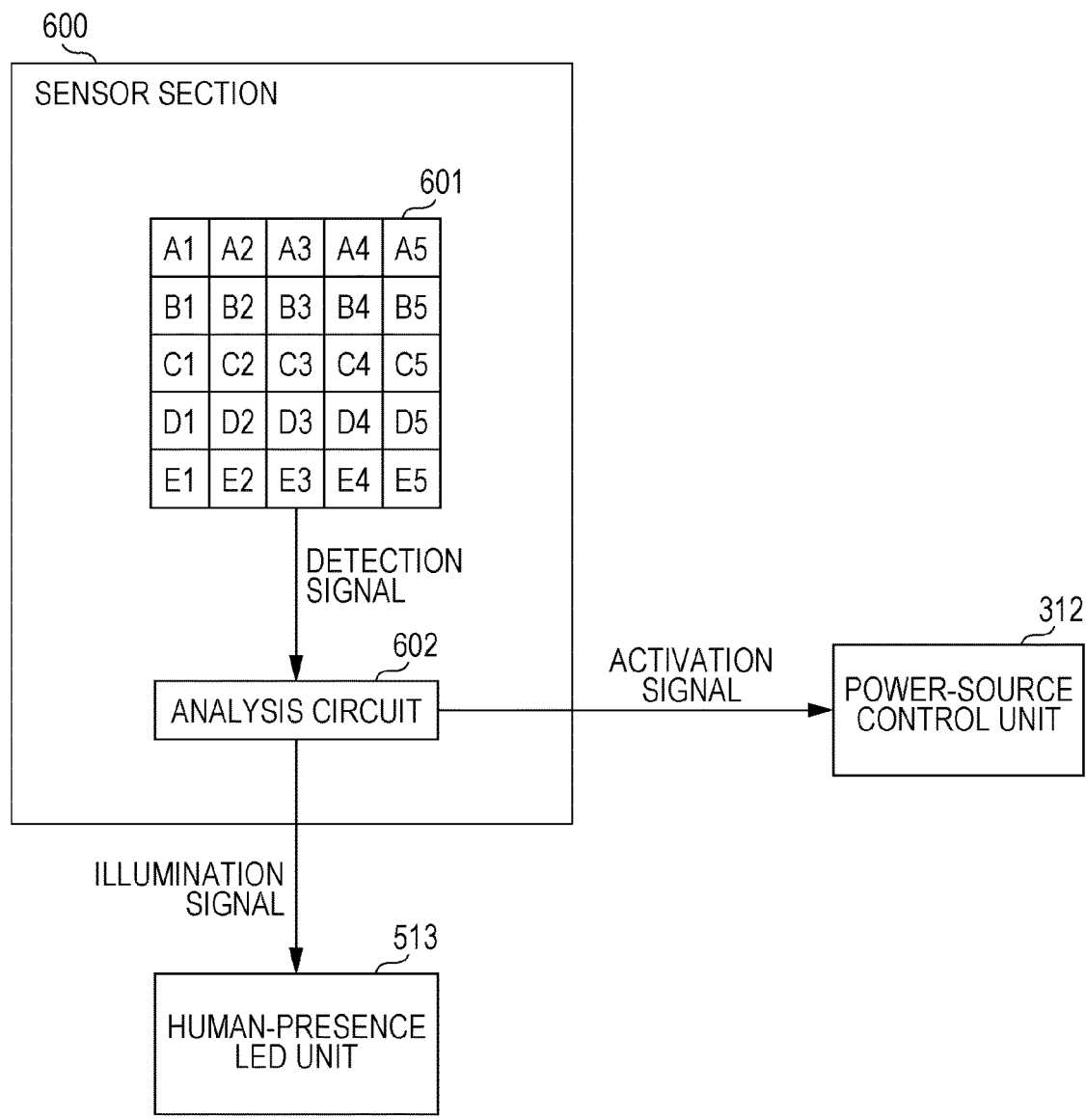
FIG. 5 is a diagram illustrating the details of the sensor section of the image forming apparatus.

FIG. 5 is a diagram illustrating the details of the sensor section 600.

As illustrated in FIG. 5, the sensor section 600 has a human-body detection sensor 601 and an analysis circuit 602. The sensor section 600 belongs to the power-source system A. In the power conservation state, power is supplied to the sensor section 600 from the power-supply section (the power-source system A) 305.

The human-body detection sensor 601 is an infrared array sensor in which reflection-type infrared sensors that radiate infrared rays and that detect reflected light of the infrared rays are arranged in a matrix form. The human-body detection sensor 601 includes a total of 25 infrared sensor elements (infrared sensor elements A1 to A5, B1 to B5, C1 to C5, D1 to D5, and E1 to E5) that are arranged in five rows and five columns. Note that the human-body detection sensor 601 is not limited to the above-mentioned infrared array sensor. For example, the human-body detection sensor 601 may be an infrared line sensor in which infrared sensors are arranged in a line. Alternatively, the human-body detection sensor 601 may be a pyroelectric array sensor in which pyroelectric sensors that sense infrared rays radiated from a person and that determine whether a person is present or absent in accordance with the amount of change in the infrared rays are arranged in a matrix form, or may be a pyroelectric line sensor in which pyroelectric sensors are arranged in a line. Alternatively, the human-body detection sensor 601 may be constituted by the infrared sensors and the pyroelectric sensors, which are mentioned above. Alternatively, a camera may be utilized as the human-body detection sensor 601.

The above-mentioned detection area 1 is an aggregate region that is an aggregate of regions which are detected by the infrared sensor elements A1 to A5, B1 to B5, C1 to C5, D1 to D5, and E1 to E5 of the human-body detection sensor 601. Furthermore, the detection area 2 is an aggregate region that is an aggregate of regions which are detected by the infrared sensor elements C3, E3, and D3 of the human-body detection sensor 601. Note that the detection area 2 may be a region which is detected by a specific infrared sensor element (for example, the infrared sensor element E3) of the human-body detection sensor 601. Note that the relationships between the detection areas and the infrared sensor elements can be appropriately selected by the user.

The analysis circuit 602 is a small-scale data processing circuit that has a processor, such as a microcomputer, and a memory. The analysis circuit 602 receives a detection signal from the human-body detection sensor 601, and determines an area in which an object has been detected. In the case where the analysis circuit 602 determines that an object has been detected in the detection area 1 described below, the analysis circuit 602 outputs an illumination signal having a Hi level to the human-presence LED unit 513 so that the light-emitting element LED of the human-presence LED unit 513 will perform illumination. Furthermore, in the case where the analysis circuit 602 determines that an object has been detected in the detection area 2 described below, the analysis circuit 602 outputs the activation signal to the power-source control unit 312 so that the image forming apparatus 100 will return from the power conservation state to the normal power state.

Regarding Human-Presence LED Unit

Figure 6:
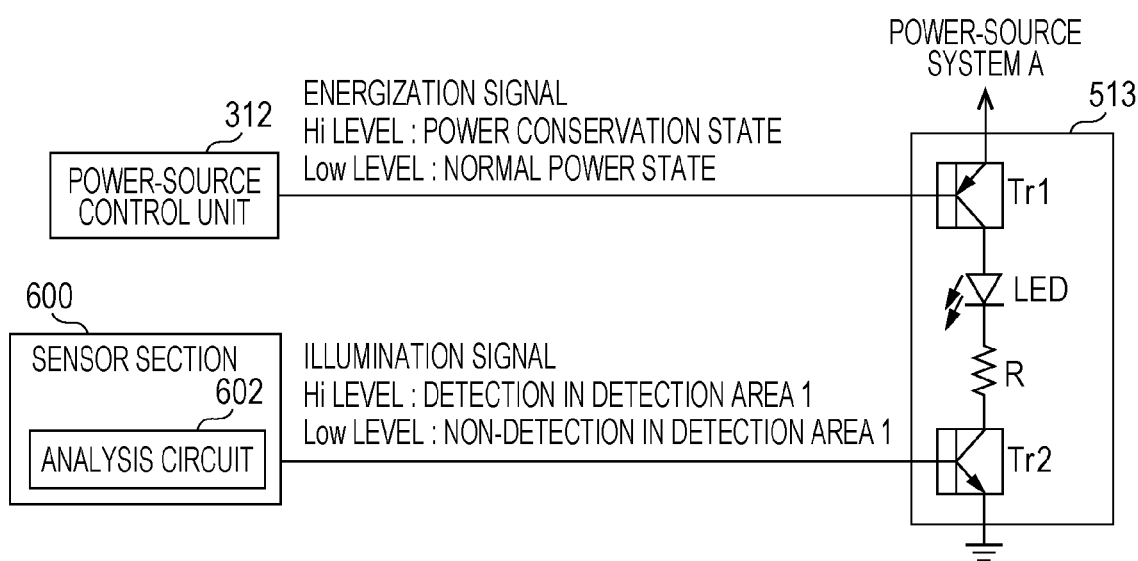
FIG. 6 is a diagram illustrating the details of a human-presence LED unit of the operation section.

FIG. 6 is a diagram illustrating the details of the human-presence LED unit 513.

As illustrated in FIG. 6, the human-presence LED unit 513 has a transistor Tr1, a transistor Tr2, the light-emitting element LED (a light emitting section), and a resistor R.

In the case where the image forming apparatus 100 is in the power conservation state, an energization signal having a Hi level is input from the power-source control unit 312 of the main controller section 101 to the transistor Tr1 of the human-presence LED unit 513. Accordingly, the transistor Tr1 enters an on-state. Accordingly, the voltage of the power-source system A is applied to the anode of the light-emitting element LED.

In addition, in the case where an object is detected in the detection area 1, the illumination signal having a Hi level is input to the transistor Tr2 from the analysis circuit 602. Accordingly, the cathode of the LED has the ground potential. Accordingly, the light-emitting element LED performs illumination.

In the case where the object is no longer detected in the detection area 1, the illumination signal having a Low level is input from the analysis circuit 602 to the transistor Tr2. Accordingly, the LED stops performing illumination.

Moreover, in the case where the image forming apparatus 100 is in the normal power state, the energization signal having a Low level is input from the power-source control unit 312 to the transistor Tr1, and the transistor Tr1 enters the off-state. Accordingly, the voltage of the power-source system A is no longer applied to the anode of the light-emitting element LED, and the LED stops performing illumination.

Regarding Illumination of LED

As illustrated in FIG. 7, the light-emitting element LED of the human-presence LED unit 513 is provided inside the power saving button 512 that is transparent. In the case where the image forming apparatus 100 is in the power conservation state and where an object is detected in the detection area 1 of the human-body detection sensor 601, the light-emitting element LED performs illumination. In the case where the object is no longer detected in the detection area 1 of the human-body detection sensor 601, the light-emitting element LED stops performing illumination. Note that, here, an example in which the light-emitting element LED performs illumination is described. However, an illumination control circuit is provided in the human-presence LED unit 513, whereby the light-emitting element LED may be made to blink. Furthermore, an interval, the light-emitting element LED blinking at the intervals, may be able to be changed by the illumination control circuit. Moreover, a PWM control circuit is provided in the human-presence LED unit 513, whereby the brightness of the light-emitting element LED may be able to be changed. Accordingly, the position of the power saving button 512 can be emphasized using the manner in which the light-emitting element LED performs illumination.

Flow of Operation of Power-Source Control Unit (Normal Power State⇒Power Conservation State)

Figure 8:
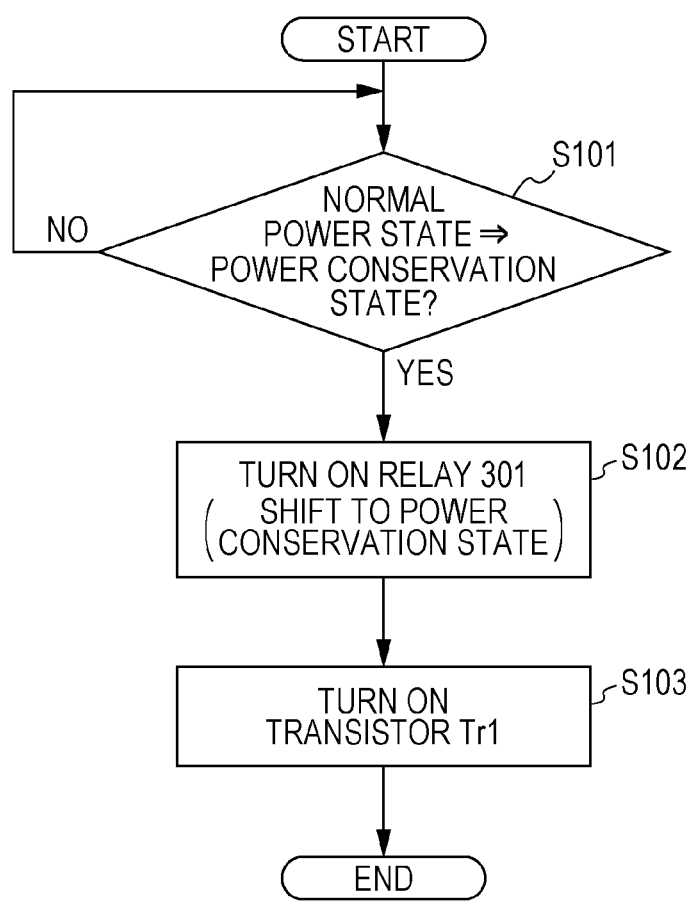
FIG. 8 is a flowchart illustrating a process performed by a power-source control unit in the case where the image forming apparatus shifts from a normal power state to a power conservation state.

Next, the power-source control unit 312 executes a control program that is stored in the HDD unit 316 and that is based on a flowchart of FIG. 8, thereby performing the process described blow.

As illustrated in FIG. 8, the power-source control unit 312 determines whether or not conditions under which the image forming apparatus 100 is to shift from the normal power state to the power conservation state are satisfied (S101).

Note that the conditions under which the image forming apparatus 100 is to shift from the normal power state to the power conservation state are as follows:

(i) the operation section 500 of the image forming apparatus 100 is not operated continuously for a predetermined time period;

(ii) data is not received continuously for a predetermined time period from an external device, such as the PC 107, via the network 106; and (iii) the power saving button 512 of the operation section 500 is pressed.

Regarding the image forming apparatus 100 according to the present embodiment, in the case where both the condition (i) and the condition (ii) described above are satisfied or in the case where the condition (iii) described above is satisfied, the image forming apparatus 100 shifts from the normal power state to the power conservation state.

In the case where both the condition (i) and the condition (ii) described above are satisfied or in the case where the condition (iii) described above is satisfied (S101:Yes), the power-source control unit 312 turns off the relay 301 of the power-source device 300 (S102). Accordingly, supply of power from the alternating current power source to the power-source section 302 is stopped. Thus, supply of power to the individual units of the main controller section 101 and one portion of the operation section 500, which belong to the power-source system B, and the printer section 102 and the scanner section 103 is stopped, and the image forming apparatus 100 enters the power conservation state.

Furthermore, in the present embodiment, the power-source control unit 312 outputs the energization signal having a Hi level to the transistor Tr1 of the human-presence LED unit 513, whereby the transistor Tr1 is switched to the on-state. Accordingly, a voltage is applied to the anode of the light-emitting element LED, and the light-emitting element LED enters a state of being able to perform illumination.

Flow of Determination Performed by Analysis Circuit

Figure 9:
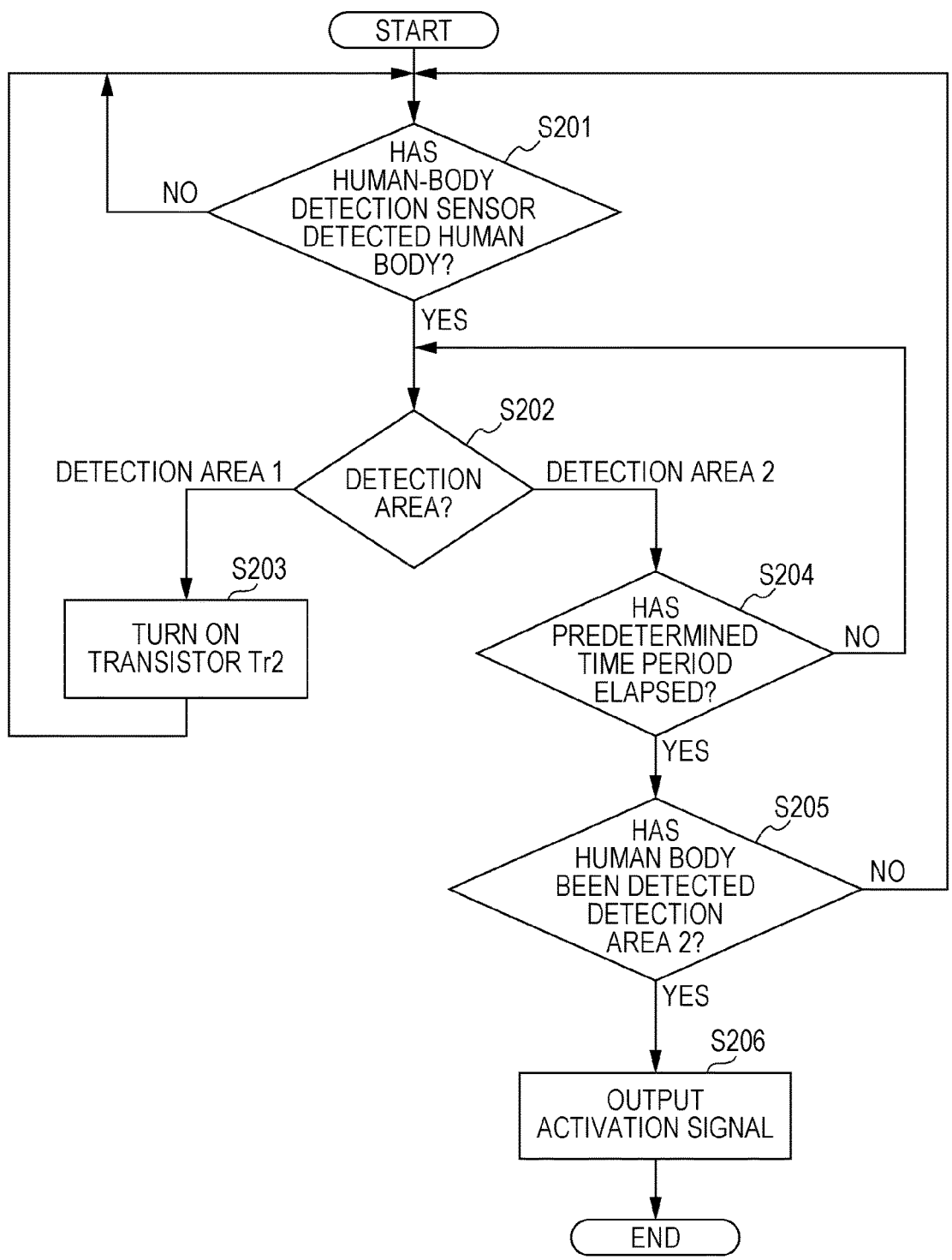
FIG. 9 is a flowchart illustrating a process performed by an analysis circuit of the sensor section in the power conservation state.

Next, the processor, such as a microcomputer, included in the analysis circuit 602 executes a control program that is stored in a memory of the sensor section 600 and that is based on a flowchart of FIG. 9, thereby performing the process described below.

Power is supplied, in the power conservation state, from the power-source device 300 to the sensor section 600 that belongs to the power-source system A and that includes the analysis circuit 602. Individual steps described below are performed when the image forming apparatus 100 is in the power conservation state.

The processor of the analysis circuit 602 determines whether the human-body detection sensor 601 has detected an object (S201). Specifically, in the case where the processor of the analysis circuit 602 has received the detection signal from the human-body detection sensor 601, the processor of the analysis circuit 602 determines that the human-body detection sensor 601 has detected an object (S201: Yes). In the case where the processor of the analysis circuit 602 determines that the human-body detection sensor 601 has detected an object (S201:Yes), the processor of the analysis circuit 602 determines which area is the area in which the object has been detected (S202). In the case where the processor of the analysis circuit 602 determines that the object has been detected in the detection area 1, the processor of the analysis circuit 602 outputs the illumination signal having a Hi level to the transistor Tr2 of the human-presence LED unit 513 (S203). While the object is being continuously detected in the detection area 1, the processor of the analysis circuit 602 continuously outputs the illumination signal having a Hi level to the transistor Tr2. Accordingly, the transistor Tr2 is switched to an on-state. As a result, the light-emitting element LED emits light, and the power saving button 512 is emphasized.

Then, in the case where the processor of the analysis circuit 602 determines that the object has been detected in the detection area 2, the processor of the analysis circuit 602 waits until a predetermined time period (for example, 100 ms) elapses (S204). When the object has been detected in the detection area 2, the light-emitting element LED stops performing illumination. After the predetermined time period has elapsed, the processor of the analysis circuit 602 determines whether or not the object has been detected in the detection area 2 (S205). After the predetermined time period has elapsed, in the case where the processor of the analysis circuit 602 has detected the object again in the detection area 2 (S205), the processor of the analysis circuit 602 outputs the activation signal to the power-source control unit 312 (S206).

When the power-source control unit 312 receives the activation signal from the processor of the analysis circuit 602 described above, the power-source control unit 312 makes the relay 301 of the power-source device 300 enter the on-state. Accordingly, the image forming apparatus 100 returns from the power conservation state to the normal power state.

Flow of Operation of Power-Source Control Unit (Power Conservation State⇒Normal Power State)

Figure 10:
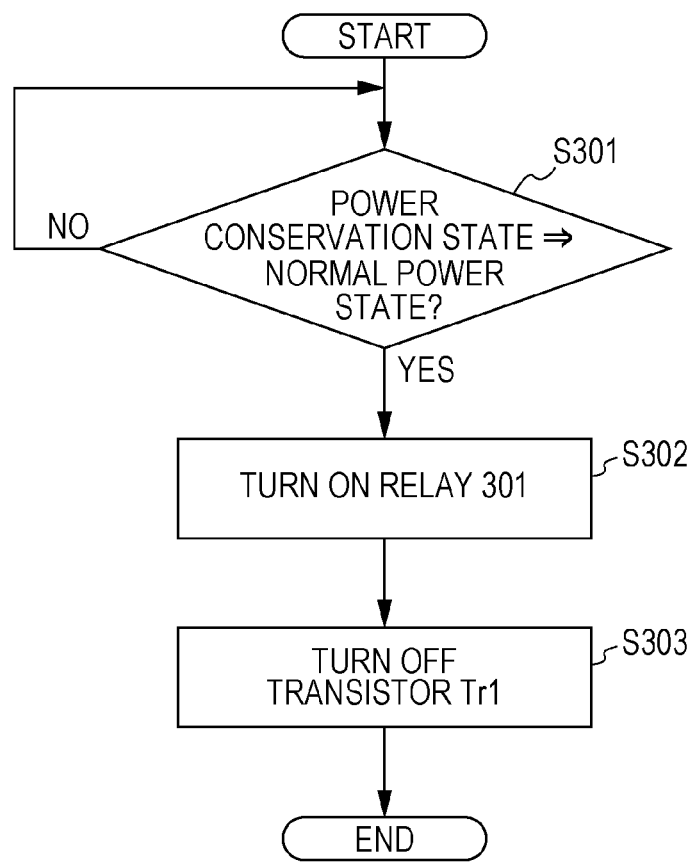
FIG. 10 is a flowchart illustrating a process performed by the power-source control unit in the case where the image forming apparatus shifts from the power conservation state to the normal power state.

Next, the power-source control unit 312 executes a control program that is stored in the HDD unit 316 and that is based on a flowchart of FIG. 10, thereby performing the process described blow.

As illustrated in FIG. 10, the power-source control unit 312 determines whether or not conditions under which the image forming apparatus 100 is to shift from the power conservation state to the normal power state are satisfied (S301).

Note that the conditions under which the image forming apparatus 100 is to shift from the power conservation state to the normal power state are as follows:

(A) an object is detected in the detection area 2;
(B) data is received from an external device, such as the PC 107, via the network 106; and
(C) the power saving button 512 is pressed.

Regarding the image forming apparatus 100 according to the present embodiment, in the case where any one of the conditions (A), (B), and (C) described above is satisfied, the image forming apparatus 100 shifts from the power conservation state to the normal power state.

In the case where any one of the conditions (A), (B), and (C) described above is satisfied, the power-source control unit 312 performs control so that the relay 301 of the power-source device 300 will enter the on-state. Accordingly, power is supplied from the alternating current power source to the power-source section 302 and the power-supply section 306. Thus, supply of power to the individual units of the main controller section 101 and one portion of the operation section 500, which belong to the power-source system B, and the printer section 102 and the scanner section 103 starts, and the image forming apparatus 100 enters the normal power state.

Furthermore, in the present embodiment, the power-source control unit 312 outputs the energization signal having a Low level to the transistor Tr1 of the human-presence LED unit 513, whereby the transistor Tr1 is switched to the off-state. Accordingly, the voltage is no longer applied to the anode of the light-emitting element LED, and the light-emitting element LED enters a state of being unable to perform illumination (a state in which, even when an object is detected in the detection area 1 by the human-body detection sensor 601 and when the illumination signal having a Hi level is input, the light-emitting element LED does not emit light).

Second Embodiment

In the first embodiment described above, an example is described, in which the detection area of the human-body detection sensor 601 is divided into two detection areas that are the detection area 1 and the detection area 2. In a second embodiment, an example will be described, in which the detection area of the human-body detection sensor 601 is subdivided into detection areas compared with those in the first embodiment. Note that a description of a duplicate portion of the first embodiment will be omitted.

FIG. 11 is a diagram illustrating detection areas of the human-body detection sensor 601 in the second embodiment of the present invention.

In the second embodiment, the detection area 1 in the first embodiment is subdivided into a detection area 1-1, a detection area 1-2, and a detection area 1-3. The detection area 2 is similar to that in the first embodiment, and is a range in which, in the case where an object has been detected, the image forming apparatus 100 is returned from the power conservation state to the normal power state.

Note that a sensor which is utilized as the human-body detection sensor 601 in the second embodiment may include a plurality of sensors, and the plurality of sensors may detect the individual detection areas. Alternatively, the human-body detection sensor 601 may be an array sensor in which sensor elements are arranged in a matrix form or in a line, and which detects the individual detection areas.

Flow of Determination Performed by Analysis Circuit

Figure 12:
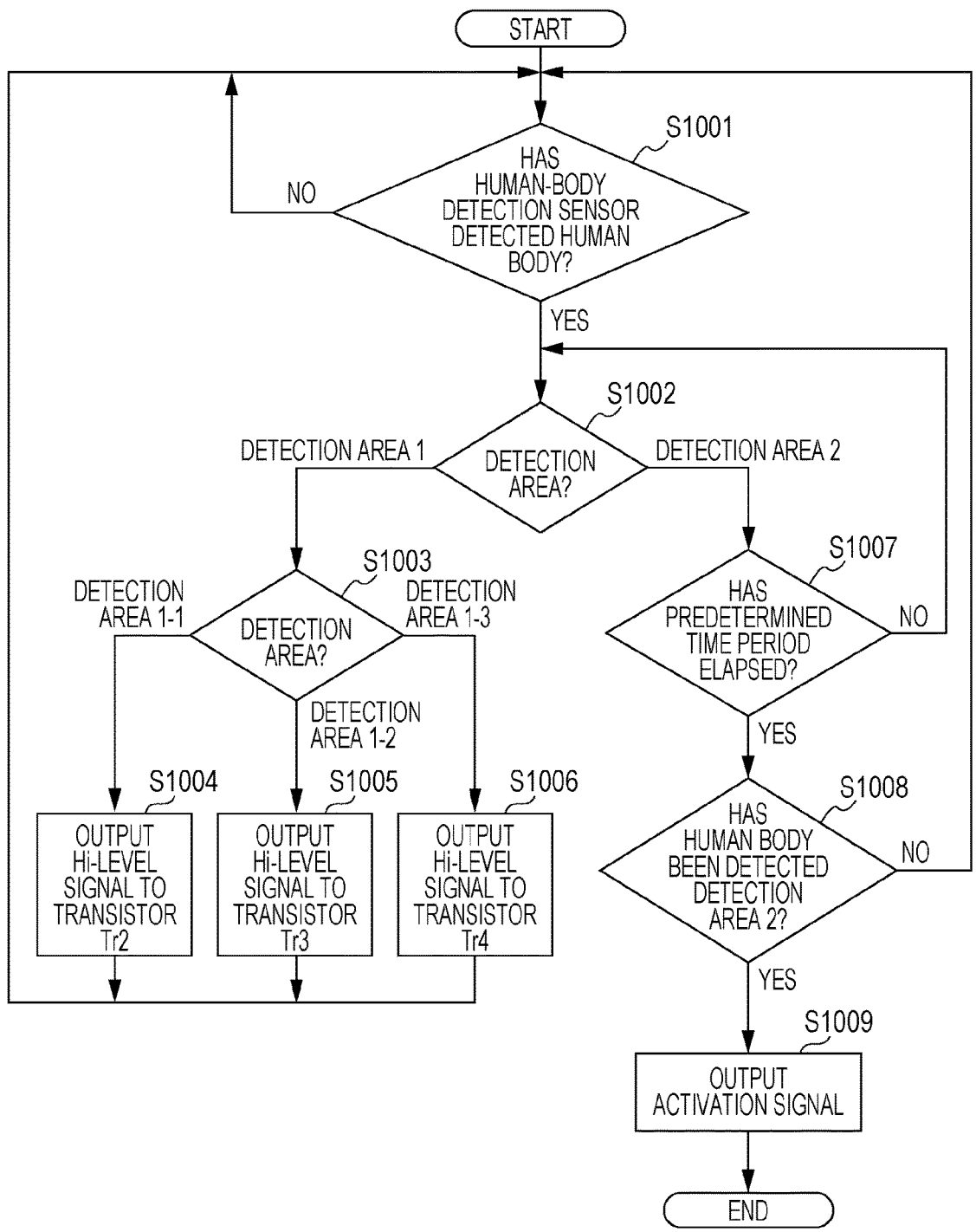
FIG. 12 is a flowchart illustrating a process performed by an analysis circuit of the sensor section in the case where the image forming apparatus according to the second embodiment is in the power conservation state.

Next, the processor, such as a microcomputer, included in the analysis circuit 602 executes a control program that is stored in the memory of the sensor section 600 and that is based on a flowchart of FIG. 12, thereby performing the process described below.

Power is supplied, in the power conservation state, from the power-source device 300 to the sensor section 600 that belongs to the power-source system A and that includes the analysis circuit 602. Individual steps described below are performed when the image forming apparatus 100 is in the power conservation state.

The analysis circuit 602 determines whether the human-body detection sensor 601 has detected an object (S1001). Specifically, in the case where the analysis circuit 602 has received the detection signal from the human-body detection sensor 601, the analysis circuit 602 determines that the human-body detection sensor 601 has detected an object (S1001:Yes). In the case where the analysis circuit 602 determines that the human-body detection sensor 601 has detected an object (S1001:Yes), the analysis circuit 602 determines which area is the area in which the object has been detected (S1002, S1003). In the case where the analysis circuit 602 determines that the object has been detected in the detection area 1-1 (S1003:the detection area 1-1), the analysis circuit 602 outputs an illumination signal A having a Hi level to the transistor Tr2 described below (S1004). Furthermore, in the case where the analysis circuit 602 determines that the object has been detected in the detection area 1-2, the analysis circuit 602 outputs an illumination signal B having a Hi level to a transistor Tr3 described below (S1005). Moreover, in the case where the analysis circuit 602 determines that the object has been detected in the detection area 1-3, the analysis circuit 602 outputs an illumination signal C having a Hi level to a transistor Tr4 described below (S1006).

Then, in the case where the analysis circuit 602 determines that the object has been detected in the detection area 2, the analysis circuit 602 waits until a predetermined time period (for example, 100 ms) elapses (S1007). After the predetermined time period has elapsed, the analysis circuit 602 determines whether or not the object has been detected in the detection area 2 (S1008). After the predetermined time period has elapsed, in the case where the analysis circuit 602 has detected the object again in the detection area 2 (S1008: Yes), the analysis circuit 602 outputs the activation signal to the power-source control unit 312 (S1009).

When the power-source control unit 312 has received the above-mentioned notification from the analysis circuit 602, the power-source control unit 312 makes the relay 301 of the power-source device 300 enter the on-state. Accordingly, the image forming apparatus 100 returns from the power conservation state to the normal power state.

Next, the details of the human-presence LED unit 513 included in the image forming apparatus 100 according to the second embodiment will be described.

Figure 13:
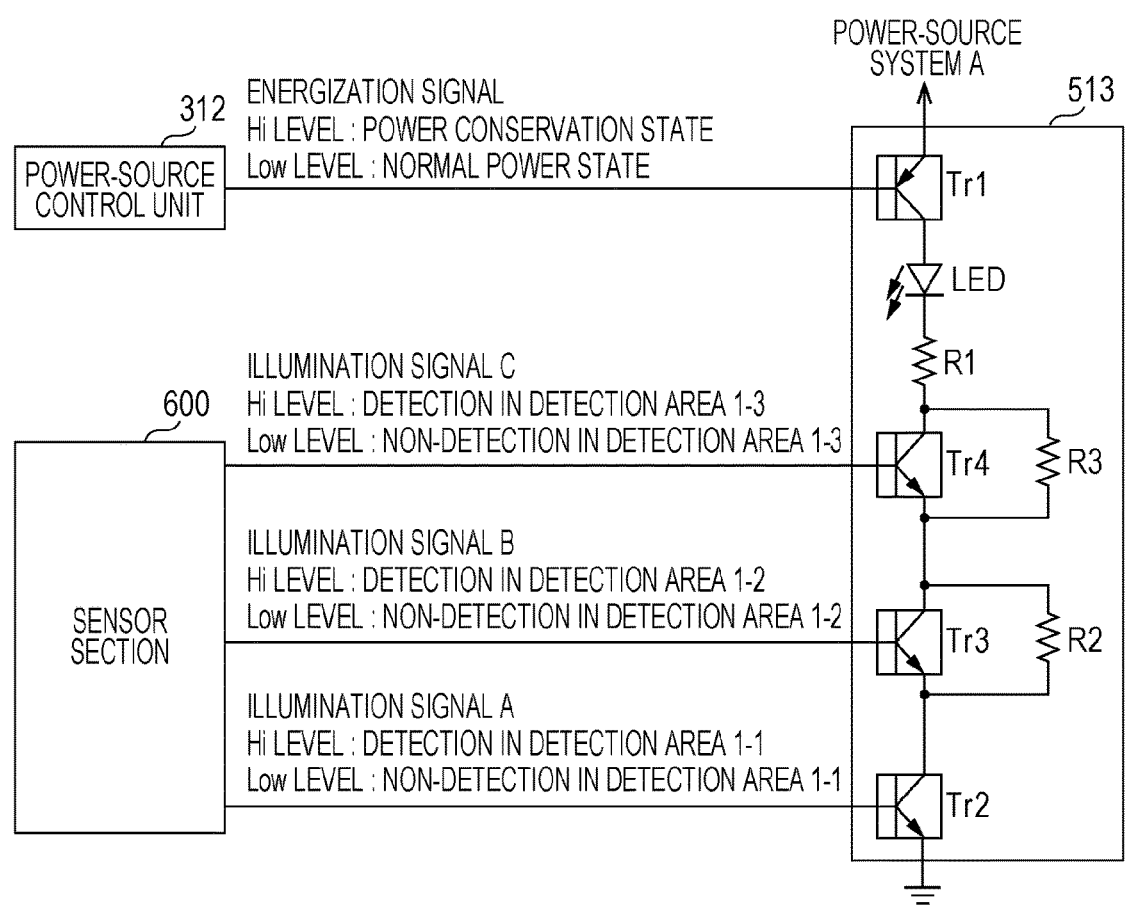
FIG. 13 is a diagram illustrating the details of a human-presence LED unit of the image forming apparatus according to the second embodiment.

As illustrated in FIG. 13, the human-presence LED unit 513 has the transistors Tr1, Tr2, Tr3, and Tr4, the light-emitting element LED, and resistors R1, R2, and R3. The transistors Tr1, Tr2, Tr3, and Tr4 are connected in series. Furthermore, the resistor R2 is connected in parallel with the transistor Tr3, and the resistor R3 is connected in parallel with the transistor Tr4.

When an object has been detected by the human-body detection sensor 601 in the detection area 1-1, the illumination signal A having a Hi level is input to the transistor Tr2, and the transistor Tr2 enters the on-state. In this case, the transistors Tr3 and Tr4 are in an off-state. Accordingly, a current flows through the light-emitting element LED in accordance with a total resistance value of the resistors R1, R2, and R3, and the light-emitting element LED emits light.

Furthermore, when the object has been detected by the human-body detection sensor 601 in the detection area 1-2, in addition to the transistor Tr2, the illumination signal B having a Hi level is input to the transistor Tr3, and, in addition to the transistor Tr2, the transistor Tr3 enters an on-state. Because the detection area 1-2 is a region included in the detection area 1-1, both the transistor Tr2 and the transistor Tr3 enter the on-state. In this case, the transistors Tr4 is in the off-state. Accordingly, a current flows through the light-emitting element LED in accordance with a total resistance value of the resistors R1 and R3, and the light-emitting element LED emits light. The brightness of the light-emitting element LED when the object has been detected in the detection area 1-2 is higher than the brightness of the light-emitting element LED when the object has been detected in the detection area 1-1.

Furthermore, when the object has been detected by the human-body detection sensor 601 in the detection area 1-3, in addition to the transistors Tr2 and Tr3, the illumination signal C having a Hi level is input to the transistor Tr4, and, in addition to the transistors Tr2 and Tr3, the transistor Tr4 enters an on-state. Because the detection area 1-3 is a region included in the detection area 1-2, all of the transistors Tr2, Tr3, and Tr4 enter the on-state. Accordingly, a current flows through the light-emitting element LED in accordance with a resistance value of the resistor R1, and the light-emitting element LED emits light. The brightness of the light-emitting element LED when the object has been detected in the detection area 1-3 is higher than the brightness of the light-emitting element LED when the object has been detected in the detection areas 1-1 and 1-2.

In other words, the luminance of the light-emitting element LED gradually increases as an object approaches the image forming apparatus 100.

In the second embodiment, as the user approaches the image forming apparatus 100, the brightness of the light-emitting element LED provided inside the power saving button 512 increases. Thus, the user can easily grasp the position of the power saving button 512. Accordingly, even in the case where the image forming apparatus does not automatically return to the normal power state, without looking for the button for shifting the image forming apparatus to the normal power state, the user can press the power saving button 512.

Third Embodiment

In the first embodiment and the second embodiment described above, an example is described, in which the light-emitting element LED is placed inside the power saving button 512. In a third embodiment, an example will be described, in which light-emitting elements LED are provided near the power saving button 512.

Figure 14:
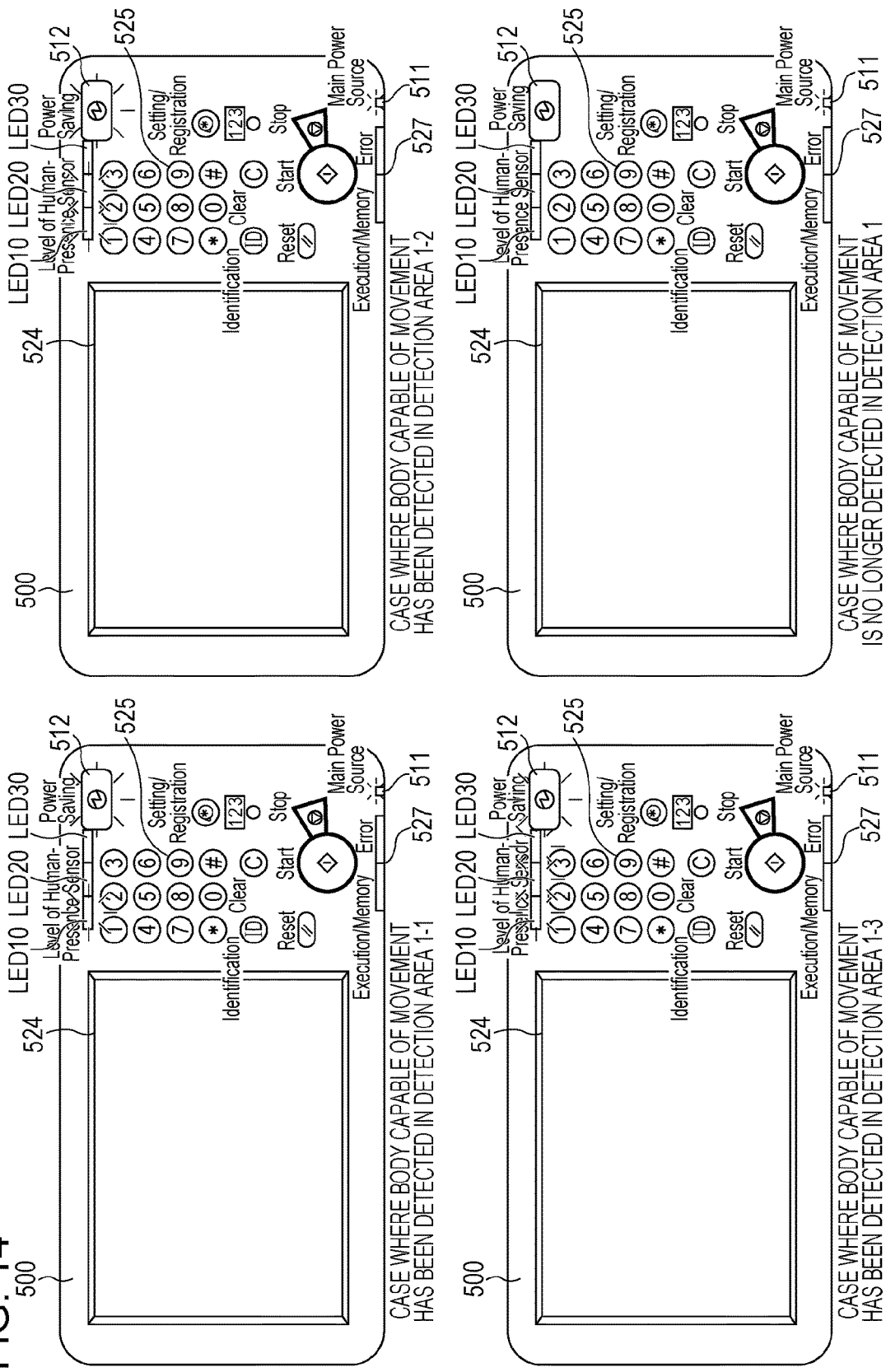
FIG. 14 is a diagram illustrating the details of a human-presence LED unit of an image forming apparatus according to a third embodiment.

As illustrated in FIG. 14, in an operation section 500 of an image forming apparatus according to the third embodiment, light-emitting elements LED10, LED20, and LED30 are provided. The light-emitting elements LED10, LED20, and LED30 are arranged in a line. Among the multiple light-emitting elements LED10, LED20, and LED30, the light-emitting element LED10 is placed so as to be farthest from the power saving button 512. Among the multiple light-emitting elements LED10, LED20, and LED30, the light-emitting element LED30 is placed so as to be nearest to the power saving button 512.

Next, the details of a human-presence LED unit 513 that has the light-emitting elements LED10, LED20, and LED30 described above will be described.

Figure 15:
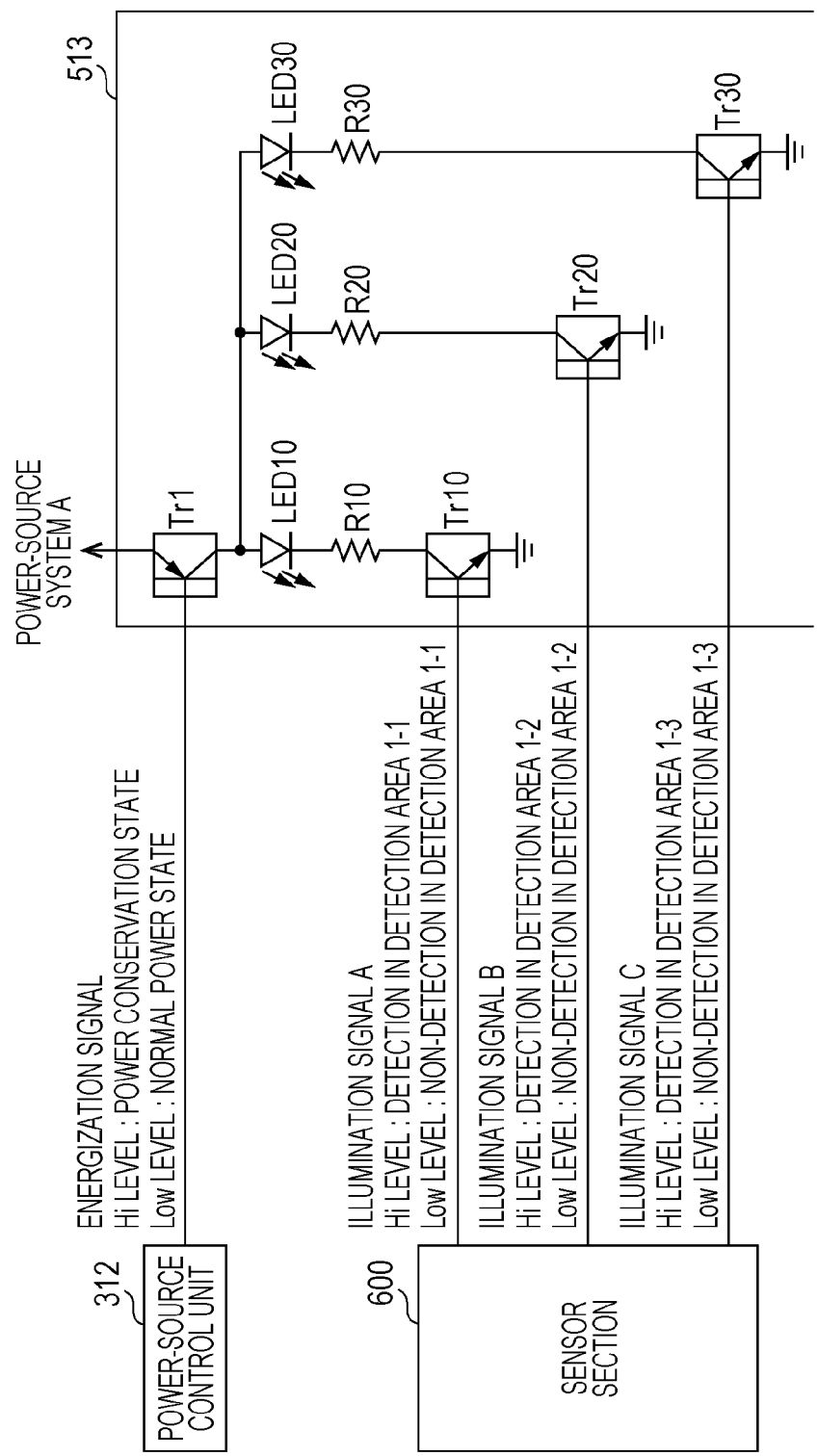
FIG. 15 is a diagram of an operation section, which illustrates a state in which light-emitting elements LED of the image forming apparatus according to the third embodiment emit light.

As illustrated in FIG. 15, the human-presence LED unit 513 in the third embodiment has transistors Tr1, Tr10, Tr20, and Tr30, the light-emitting element LED10, the light-emitting element LED20, the light-emitting element LED30, and resistors R10, R20, and R30. The transistors Tr10, Tr20, and Tr30 are connected in parallel. Furthermore, the resistor R10, the transistor Tr10, and the light-emitting element LED10 are connected in series. Moreover, the resistor R20, the transistor Tr20, and the light-emitting element LED20 are connected in series. Additionally, the resistor R30, the transistor Tr30, and the light-emitting element LED30 are connected in series.

The detection areas of the human-body detection sensor 601 of the image forming apparatus 100 according to the third embodiment are similar to those in the second embodiment.

When an object has detected in the detection area 1-1 by the human-body detection sensor 601, the illumination signal A having a Hi level to the transistor Tr10, and the transistor Tr10 enters an on-state. In this case, the transistors Tr20 and Tr30 are in an off-state. Accordingly, a current flows through the light-emitting element LED10, and the light-emitting element LED10, which is farthest from the power saving button 512, emits light.

Moreover, when the object has detected in the detection area 1-2 by the human-body detection sensor 601, in addition to the transistor Tr10, the illumination signal B having a Hi level is input to the transistor Tr20, and, in addition to the transistor Tr10, the transistor Tr20 enters an on-state. In this case, the transistor Tr30 is in the off-state. Accordingly, a current flows through the light-emitting elements LED10 and 20, and the light-emitting elements LED10 and 20 emit light.

Additionally, when the object has detected in the detection area 1-3 by the human-body detection sensor 601, in addition to the transistors Tr10 and Tr20, the illumination signal C having a Hi level is input to the transistor Tr30. Accordingly, in addition to the transistors Tr10 and Tr20, the transistor Tr30 enters an on-state. As a result, a current flows through the light-emitting elements LED10, 20, and 30, and the light-emitting elements LED10, 20, and 30 emit light.

In other words, as an object approaches the image forming apparatus 100, the number of light-emitting elements LED that emit light increases. In addition, as an object approaches the image forming apparatus 100, the light-emitting elements LED perform illumination in order from the light-emitting element LED farthest from the power saving button 512.

In the third embodiment, as the user approaches the image forming apparatus 100, the number of light-emitting elements that emit light of the power saving button 512 increases, and, the light-emitting elements LED perform illumination in order from the light-emitting element LED that is most distant from the power saving button 512. Thus, the user can easily grasp the position of the power saving button 512. Accordingly, even in the case where the image forming apparatus does not automatically return to the normal power state, without looking for the button for shifting the image forming apparatus to the normal power state, the user can press the power saving button 512.

Forth Embodiment

In the first to third embodiments described above, an example is described, in which, when the image forming apparatus 100 does not automatically return to the normal power state, in order to make the user recognize the power saving button 512 that the user should operate next, the light-emitting element LED is placed inside or in the vicinity of the power saving button 512. In a fourth embodiment, when the image forming apparatus 100 does not automatically return to the normal power state, in order to make the user recognize an NFC section 700 that the user should operate next, the NFC (Near Field Communication) section 700 is made to emit light.

As illustrated in FIG. 16, an image forming apparatus 100 according to the fourth embodiment includes the NFC section 700, in addition to the printer section 102, the scanner section 103, and so forth described above.

The NFC section 700 reads, from a mobile terminal or a card (hereinafter, referred to as a "mobile terminal or the like"), information stored in the mobile terminal or the like. Identification information of the user who is to use the image forming apparatus 100 is stored in the mobile terminal or the like, and the NFC section 700 acquires the identification information from the mobile terminal or the like. In the image forming apparatus according to the fourth embodiment, the light-emitting element LED is placed inside the NFC section 700. Then, in the case where the human-body detection sensor 601 has detected an object in the detection area 1, the light-emitting element LED emits light. Accordingly, a portion of the NFC section 700 that is a portion which the mobile terminal or the like is to come close to is made to emit light.

In the image forming apparatus 100 according to the fourth embodiment, the user who comes close to the image forming apparatus 100 can easily recognize the position of the NFC section that the user should operate next.

Note that, in the forth embodiment, the NFC section 700 is described. However, the NFC section 700 may be a card reader section. In addition to the NFC section 700, the power saving button 512 described above may be made to emit light.

Furthermore, in the fourth embodiment, as illustrated in FIG. 17, as the user approaches the image forming apparatus 100, the brightness of the NFC section 700 may gradually increase.

Other Embodiment

The present invention has been described above on the basis of the preferable embodiments of the present invention. However, the present invention is not limited to any one of the specific embodiments, and various embodiments without departing from the gist of the present invention are included in the present invention. Furthermore, portions of the embodiments described above may be appropriately combined with each other.

For example, in the embodiments described above, an example is described, in which the power saving button 512 or the NFC section 700 is emphasized using emission of an LED. However, the present invention is not limited thereto. For example, in the case where an object has been detected in the detection area 1, a sound may be output by the buzzer 526.

Moreover, in the embodiments described above, an example is described, in which the present invention is applied to an MFP having a plurality of functions. However, the present invention is not limited thereto. The present invention may be applied to an SFP (Singlefunction Peripheral) having one function among the scanner function, the print function, and the fax function.

Additionally, in the embodiments described above, an example is described, in which infrared sensors that detect infrared rays radiated from an object (a static body or a body capable of movement) are used. However, the present invention is not limited thereto. Sensors that detect movement of an object may be used. Note that the method for detecting an object is not limited thereto.

Furthermore, in the embodiments described above, an example is described, in which, in the power conservation state, supply of power to the printer section 102 and the scanner section 103 is stopped. However, in the present invention, in the power conservation state, supply of power to both the printer section 102 and the scanner section may be not necessarily stopped. Specifically, in the power conservation state, supply of power to the printer section 102 may be stopped, and supply of power to the scanner section 103 may be maintained. Alternatively, in the power conservation state, supply of power to the scanner section 103 may be stopped, and supply of power to the printer section 102 may be maintained.

Functions illustrated in the flowcharts in the present embodiments can be realized also by executing, with a processing device (a CPU, a processor) of a personal computer or the like, software (a program) acquired via a network or various types of storage media.

According to the present invention, a user can be made to recognize a position which the user should operate in order to manually return the image forming apparatus from the second power state to the first power state, even in the case where the image forming apparatus does not automatically return, using a human-body detection sensor, from the second power state to the first power state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2012/081469, filed Dec. 5, 2012, which is hereby incorporated by reference herein in its entirety.

The invention claimed is:

1. An image forming apparatus having a first power state and a second power state in which the image forming apparatus consumes less power than in the first power state, the image forming apparatus comprising:
   a human sensor;
   a controller which determines, on a basis of a result of a sensing by the human sensor, whether a human enters a first area, and determines, on a basis of a result of a sensing by the human sensor, whether a human enters a second area which includes a position situated, compared to the first area, distant from the image forming apparatus;
   a button which receives a user operation causing the image forming apparatus to shift from the second power state to the first power state;
   a light emitter which emphasizes the button;
   a state controller which shifts a state of the image forming apparatus from the second power state to the first power state based on the user operation, and shifts the state of the image forming apparatus from the second power state to the first power state based on the determination by the controller that a human enters the first area; and
   a light controller which changes a state of the light emitter to a predetermined light emitting state based on the determination by the controller that a human enters the second area.

2. The image forming apparatus according to claim 1, wherein the light controller changes the state of the light emitter to a blink state based on the determination by the controller that a human enters the second area.

3. The image forming apparatus according to claim 1, wherein the light controller changes the state of the light emitter to an another predetermined light emitting state different from the predetermined light emitting state based on the determination by the controller that a human enters the first area.

4. The image forming apparatus according to claim 1, wherein the light controller performs control so that a brightness of the light emitter is changed little by little based on the determination by the controller that a human enters the second area.

5. The image forming apparatus according to claim 1, wherein the light controller performs control so that a brightness of the light emitter increases as a human approaches the image forming apparatus.

6. The image forming apparatus according to claim 1, wherein the image forming apparatus has at least one of a copy function, a print function, and a fax function.

7. The image forming apparatus according to claim 1, wherein the human sensor is a pyroelectric sensor.

8. The image forming apparatus according to claim 1, wherein the human sensor is an infrared array sensor in which infrared sensors are arranged.

9. The image forming apparatus according to claim 1, further comprising:
   a display,
   wherein the button is provided near the display.

10. The image forming apparatus according to claim 1, further comprising a touch panel, wherein the touch panel is separate from the button.

11. The image forming apparatus according to claim 1, further comprising:
   a display,
   wherein the display is turned off in the second power state and the display is turned on in the first power state.

12. The image forming apparatus according to claim 1, wherein the human sensor senses a human while the image forming apparatus is in the second power state.

13. The image forming apparatus according to claim 1, wherein the light controller turns off the light emitter based on the user operation or based on the determination by the controller that a human enters the first area.

14. The image forming apparatus according to claim 1, wherein
   the human sensor includes a plurality of sensor sections, and the controller determines, on a basis of a result of one or more sensings by one or more sensor sections among the plurality of sensor sections, whether a human enters the first area, and determines, on a basis of a result of one or more sensings by another one or more sensor sections that are different from the one or more sensor sections among the plurality of sensor sections, whether a human enters the second area.

15. The image forming apparatus according to claim 1, wherein the button further receives a user operation causing the image forming apparatus to shift from the first power state to the second power state.

16. The image forming apparatus according to claim 1, wherein the button is a transparent button and the light emitter is provided below the transparent button.

17. A method for controlling an image forming apparatus, the method comprising:
   sensing a human by a human sensor;
   determining, on a basis of a result of a sensing by the human sensor, whether a human enters a first area;
   determining, on a basis of a result of a sensing by the human sensor, whether a human enters a second area which includes a position situated, compared to the first area, distant from the image forming apparatus;
   receiving, via a button, a user operation causing the image forming apparatus to shift from a second power state to a first power state, the second power state being a state where the image forming apparatus consumes less power than in the first power state;

shifting a state of the image forming apparatus from the second power state to the first power state based on the user operation;

shifting a state of the image forming apparatus from the second power state to the first power state based on the determination that a human enters the first area; and changing a state of a light emitter that emphasizes the button to a predetermined light emitting state based on the determination that a human enters the second area.

18. The method according to claim 17, wherein 1 the light emitter is turned on in the first power state and the light emitter is turned off in the second power state.

19. The method according to claim 17, wherein the changing is changing the state of the light emitter to a blink state.

20. The method according to claim 17, further comprising:

turning off the light emitter based on the determination that a human enters the first area.

* * * * *